US 8,991,248 B2

(12) United States Patent
Imanaka et al.

(10) Patent No.: US 8,991,248 B2
(45) Date of Patent: Mar. 31, 2015

(54) ANGULAR VELOCITY SENSOR

(75) Inventors: Takashi Imanaka, Osaka (JP); Hiroyuki Aizawa, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 387 days.

(21) Appl. No.: 13/508,521

(22) PCT Filed: Jan. 27, 2011

(86) PCT No.: PCT/JP2011/000435
§ 371 (c)(1),
(2), (4) Date: May 7, 2012

(87) PCT Pub. No.: WO2011/093077
PCT Pub. Date: Aug. 4, 2011

(65) Prior Publication Data
US 2012/0227489 A1    Sep. 13, 2012

(30) Foreign Application Priority Data

Jan. 29, 2010 (JP) ................................. 2010-018157
Jan. 29, 2010 (JP) ................................. 2010-018158
Jan. 29, 2010 (JP) ................................. 2010-018159

(51) Int. Cl.
G01C 19/56         (2012.01)
G01C 19/574        (2012.01)

(52) U.S. Cl.
CPC ..................... G01C 19/574 (2013.01)
USPC .................................................. 73/504.12

(58) Field of Classification Search
USPC .................................................... 73/504.12
See application file for complete search history.

(56) References Cited

U.S. PATENT DOCUMENTS

| 5,719,460 | A | 2/1998 | Watarai et al. | |
|---|---|---|---|---|
| 6,463,803 | B2* | 10/2002 | Fujii et al. | 73/514.32 |
| 6,698,292 | B2* | 3/2004 | Kikuchi | 73/662 |
| 7,255,005 | B2* | 8/2007 | Ogura | 73/504.12 |
| 7,268,646 | B2* | 9/2007 | Lutz et al. | 333/186 |
| 2002/0134156 | A1 | 9/2002 | Matsubara et al. | |
| 2005/0217378 | A1* | 10/2005 | Ishikawa et al. | 73/514.01 |
| 2007/0163344 | A1 | 7/2007 | Ohuchi et al. | |
| 2008/0134781 | A1 | 6/2008 | Noguchi et al. | |
| 2009/0266163 | A1* | 10/2009 | Ohuchi et al. | 73/504.12 |

(Continued)

FOREIGN PATENT DOCUMENTS

| JP | 8-210860 A | 8/1996 |
|---|---|---|
| JP | 2001-165664 A | 6/2001 |

(Continued)

OTHER PUBLICATIONS

International Search Report issued in International Patent Application No. PCT/JP2011/000435, mailed Mar. 1, 2011.

*Primary Examiner* — Hezron E Williams
*Assistant Examiner* — Mark A Shabman
(74) *Attorney, Agent, or Firm* — McDermott Will & Emery LLP

(57) ABSTRACT

An angular velocity sensor includes a support body, a retaining portion connected to the support body, first to fourth weights, first to fourth arms, a drive unit for driving the first to fourth arms, and a monitor unit for detecting displacements of the first to fourth arms. An X-axis, a Y-axis, and a Z-axis that are perpendicular to each other are defined. The detector unit is symmetrical with respect to both an axis parallel to the X-axis and an axis parallel to the Y-axis. This angular velocity sensor can cancel an undesired signal caused by external disturbances, such as acceleration or impact, thus detecting an angular velocity accurately.

7 Claims, 25 Drawing Sheets

(56) References Cited

U.S. PATENT DOCUMENTS

| | | | |
|---|---|---|---|
| 2009/0320594 A1* | 12/2009 | Ohuchi et al. | 73/504.16 |
| 2010/0071468 A1 | 3/2010 | Ohuchi et al. | |
| 2010/0126270 A1* | 5/2010 | Terada et al. | 73/504.12 |
| 2011/0203371 A1 | 8/2011 | Ohuchi et al. | |

FOREIGN PATENT DOCUMENTS

| | | | |
|---|---|---|---|
| JP | 2005-249646 A | 9/2005 | |
| JP | 2007-003225 A | 1/2007 | |
| JP | 2008-046056 | 2/2008 | |
| JP | 2008-122262 | 5/2008 | |
| JP | 2008-122263 A | 5/2008 | |
| JP | 2008-175632 | 7/2008 | |
| JP | 2008-203071 | 9/2008 | |
| JP | 2008-261771 | 10/2008 | |
| WO | WO 2008059757 A1 * | 5/2008 | |
| WO | WO 2008129865 A1 * | 10/2008 | |
| WO | WO 2009/034682 A1 | 3/2009 | |
| WO | WO 2009/044522 A1 | 4/2009 | |

* cited by examiner

FIG. 2
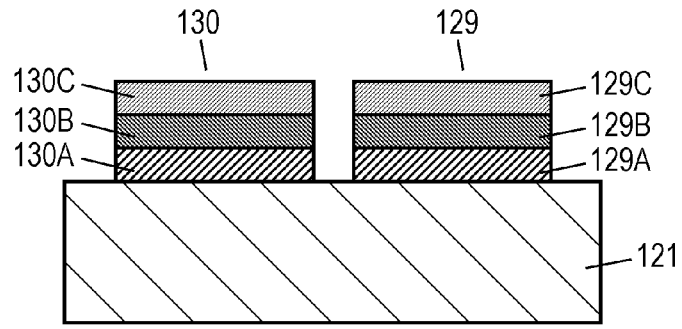
FIG. 3
|  |  | Phase of Drive Signal | Phase of Vibration of Arm |
|---|---|---|---|
| Arm 121 | Drive Element 129 | + | + |
|  | Drive Element 130 | − |  |
| Arm 122 | Drive Element 131 | + | − |
|  | Drive Element 132 | − |  |
| Arm 123 | Drive Element 133 | + | + |
|  | Drive Element 134 | − |  |
| Arm 124 | Drive Element 135 | + | − |
|  | Drive Element 136 | − |  |
FIG. 4
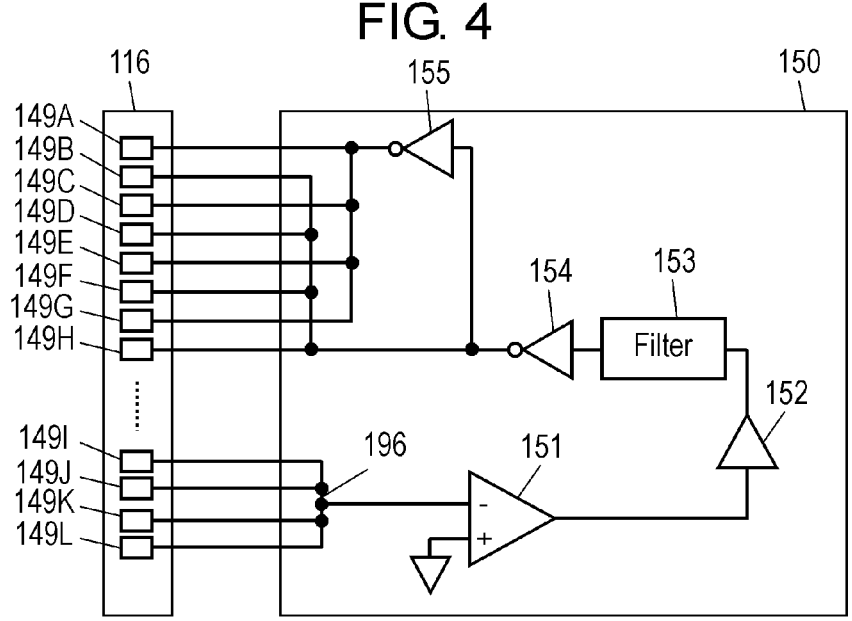

|  | Drive | Angular. Vel. about X-Axis | Angular. Vel. about Y-Axis | Angular. Vel. about Z-Axis | Accel. in X-Axis | Accel. in Y-Axis | Accel. in Z-Axis |
|---|---|---|---|---|---|---|---|
| Signal S101 | + | + | + | - | + | - | + |
| Signal S102 | - | + | + | + | - | + | + |
| Signal S103 | + | + | - | + | - | - | + |
| Signal S104 | - | + | - | - | + | + | + |
| Signal S105 | + | - | + | + | + | + | + |
| Signal S106 | - | - | + | - | - | - | + |
| Signal S107 | + | - | - | - | - | + | + |
| Signal S108 | - | - | - | + | + | - | + |
| Formula 1 | 0 | 0 | 0 | 8+ | 0 | 0 | 0 |
| Formula 2 | 0 | 0 | 8+ | 0 | 0 | 0 | 0 |
| Formula 3 | 0 | 8+ | 0 | 0 | 0 | 0 | 0 |

FIG. 10

|  | Drive | Angular. Vel. about X-Axis | Angular. Vel. about Y-Axis | Angular. Vel. about Z-Axis | Accel. in X-Axis | Accel. in Y-Axis | Accel. in Z-Axis |
|---|---|---|---|---|---|---|---|
| Signal S109 | 0 | + | 0 | 0 | + | 0 | + |
| Signal S110 | 0 | - | 0 | 0 | + | 0 | + |
| Signal S111 | 0 | + | 0 | 0 | - | 0 | + |
| Signal S112 | 0 | - | 0 | 0 | - | 0 | + |
| Formula 4 | 0 | 4+ | 0 | 0 | 0 | 0 | 0 |

FIG. 12

|  | Drive | Angular. Vel. about X-Axis | Angular. Vel. about Y-Axis | Angular. Vel. about Z-Axis | Accel. in X-Axis | Accel. in Y-Axis | Accel. in Z-Axis |
|---|---|---|---|---|---|---|---|
| Signal S113 | 0 | 0 | + | 0 | 0 | + | + |
| Signal S114 | 0 | 0 | - | 0 | 0 | + | + |
| Signal S115 | 0 | 0 | + | 0 | 0 | - | + |
| Signal S116 | 0 | 0 | - | 0 | 0 | - | + |
| Formula 5 | 0 | 0 | 4+ | 0 | 0 | 0 | 0 |

FIG. 17
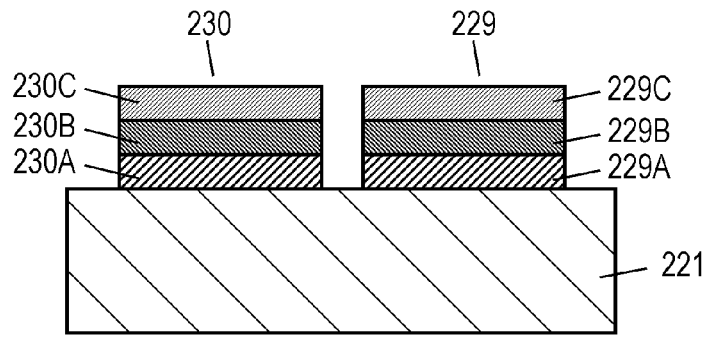
FIG. 18
| | | Phase of Drive Signal | Phase of Vibration of Arm |
|---|---|---|---|
| Arm 221 | Drive Element 229 | + | + |
| | Drive Element 230 | − | |
| Arm 222 | Drive Element 231 | + | − |
| | Drive Element 232 | − | |
| Arm 223 | Drive Element 233 | + | + |
| | Drive Element 234 | − | |
| Arm 224 | Drive Element 235 | + | − |
| | Drive Element 236 | − | |
FIG. 19
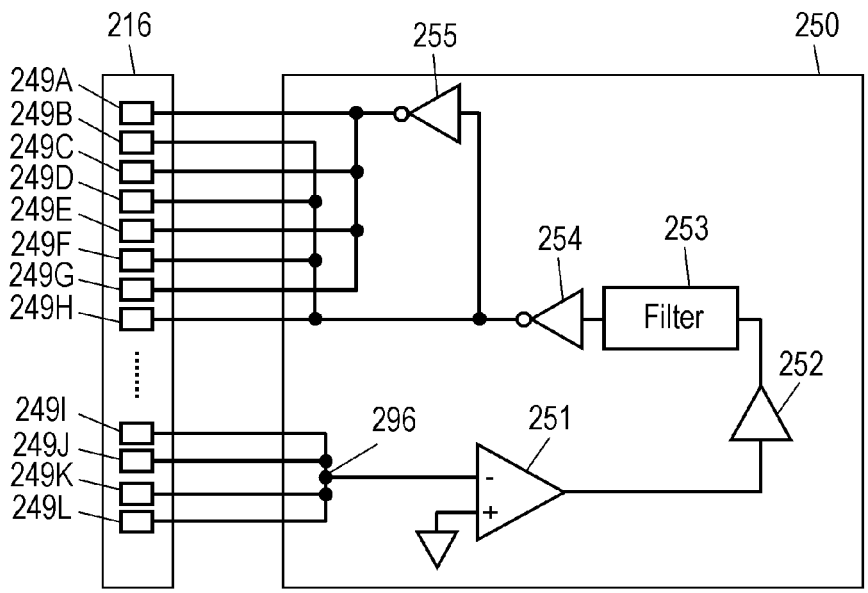

|  | Drive | Angular. Vel. about X-Axis | Angular. Vel. about Y-Axis | Angular. Vel. about Z-Axis |
|---|---|---|---|---|
| Signal S201 | + | + | + | − |
| Signal S202 | − | + | + | + |
| Signal S203 | + | + | − | + |
| Signal S204 | − | + | − | − |
| Signal S205 | + | − | + | + |
| Signal S206 | − | − | + | − |
| Signal S207 | + | − | − | − |
| Signal S208 | − | − | − | + |
| Formula 6 | 0 | 0 | 0 | 8+ |
| Formula 7 | 0 | 0 | 8+ | 0 |
| Formula 8 | 0 | 8+ | 0 | 0 |

FIG. 25
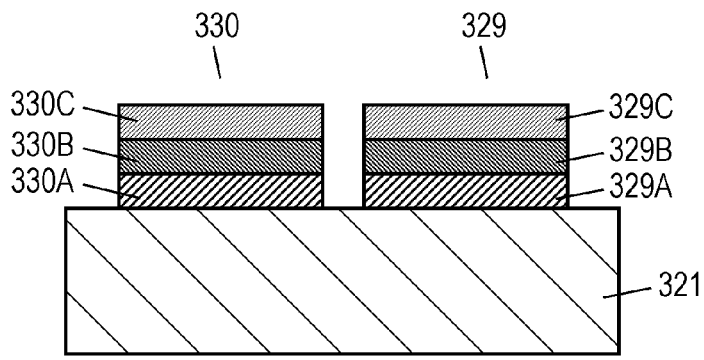
FIG. 26
| | | Phase of Drive Signal | Phase of Vibration of Arm |
|---|---|---|---|
| Arm 321 | Drive Element 329 | + | + |
| | Drive Element 330 | − | |
| Arm 322 | Drive Element 331 | + | − |
| | Drive Element 332 | − | |
| Arm 323 | Drive Element 333 | + | + |
| | Drive Element 334 | − | |
| Arm 324 | Drive Element 335 | + | − |
| | Drive Element 336 | − | |
FIG. 27
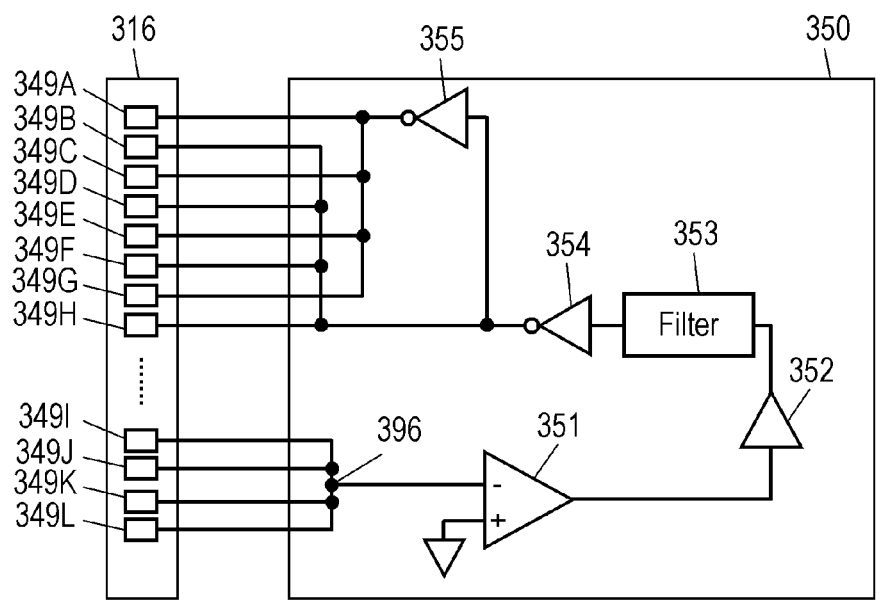

|  | Drive Electrode | Angular. Vel. about X-Axis | Angular. Vel. about Y-Axis | Angular. Vel. about Z-Axis |
|---|---|---|---|---|
| Signal S301 | + | + | + | − |
| Signal S302 | − | + | + | + |
| Signal S303 | + | + | − | + |
| Signal S304 | − | + | − | − |
| Signal S305 | + | − | + | + |
| Signal S306 | − | − | + | − |
| Signal S307 | + | − | − | − |
| Signal S308 | − | − | − | + |
| Formula 9 | 0 | 0 | 0 | 8+ |
| Formula 10 | 0 | 0 | 8+ | 0 |
| Formula 11 | 0 | 8+ | 0 | 0 |

FIG. 31

|  | Monitor | Acceleration in X-Axis | Acceleration in Y-Axis |
|---|---|---|---|
| Signal M301 | + | - | + |
| Signal M302 | + | + | + |
| Signal M303 | + | - | - |
| Signal M304 | + | + | - |
| Total | 4+ | 0 | 0 |

ANGULAR VELOCITY SENSOR

RELATED APPLICATIONS

This application is the U.S. National Phase under 35 U.S.C. §371 of International Application No. PCT/JP2011/000435, filed on Jan. 27, 2011, which in turn claims the benefit of Japanese Patent Application Nos. 2010-018157, 2010-018158 and 2010-018159, filed on Jan. 29, 2010, the disclosures of which Applications are incorporated by reference herein.

TECHNICAL FIELD

The present invention relates to an angular velocity sensor used for a mobile device, such as a portable terminal and a motor vehicle.

BACKGROUND ART

FIG. 34 is a perspective view of conventional angular velocity sensor 101. Angular velocity sensor 101 includes main frame 102, lateral beam 103 suspended by main frames 102, arms 104, 105, 106 and 107 supported by lateral beam 103, weights 108, 109, 110 and 111 connected to arms 104, 105, 106 and 107, respectively, drive element 112 for driving arms 104, 105, 106 and 107, monitor element 113 for detecting displacements of arms 104, 105, 106 and 107, and detector elements 114 and 115 for detecting displacements of arms 104, 105, 106 and 107. Lateral beam 103 extends in a direction of an X-axis out of three dimensions of the X-axis, a Y-axis, and a Z-axis that are perpendicular to each other. Arms 104 and 105 extend in a positive direction of the Y-axis with respective one ends of arms 104 and 105 supported by lateral beam 103. Respective other ends of arms 104 and 105 are connected with weights 108 and 109, respectively. Arms 106 and 107 extend in a negative direction of the Y-axis with respective one ends of arms 106 and 107 supported by lateral beam 103. Respective other ends of arms 106 and 107 are connected with weights 110 and 111. Drive element 112 drives arms 104, 105, 106, and 107 to vibrate the arms in a direction of the X-axis. Monitor element 113 detects displacements of arms 104, 105, 106, and 107 in the direction of X-axis. Detector elements 114 and 115 detect displacements of arms 104, 105, 106, and 107 in a direction of the Y-axis or a direction of the Z-axis.

Angular velocity sensor 101 may be unable to detect an angular velocity accurately due to an undesired signal arising from external disturbances, such as acceleration or impact.

Patent Literature 1 discloses an angular velocity sensor similar to conventional angular velocity sensor 101.

CITATION LIST

Patent Literature

Patent Literature 1: Japanese Patent Laid-Open Publication No. 2008-46056

SUMMARY OF THE INVENTION

An angular velocity sensor includes a support body, a retaining portion connected to the support body, first to fourth weights, first to fourth arms, a drive unit for driving the first to fourth arms, and a monitor unit for detecting displacements of the first to fourth arms. An X-axis, a Y-axis, and a Z-axis that are perpendicular to each other are defined. The detector unit is symmetrical with respect to both an axis parallel to the X-axis and an axis parallel to the Y-axis.

This angular velocity sensor can cancel an undesired signal caused by external disturbances, such as acceleration or impact, thus detecting an angular velocity accurately.

BRIEF DESCRIPTION OF DRAWINGS

FIG. 2 is a schematic cross-sectional view of the angular velocity sensor along line 2-2 shown in FIG. 1.

FIG. 3 shows phases of signals of the angular velocity sensor according to Embodiment 1.

FIG. 4 is a circuit diagram of a drive circuit connected to the angular velocity sensor according to Embodiment 1.

FIG. 10 shows phases of signals of the angular velocity sensor according to Embodiment 2.

FIG. 12 shows phases of signals of the angular velocity sensor according to Embodiment 3.

FIG. 17 is a schematic cross-sectional view of the angular velocity sensor along line 17-17 shown in FIG. 16.

FIG. 18 shows phases of signals of the angular velocity sensor according to Embodiment 5.

FIG. 19 is a circuit diagram of a drive circuit connected to the angular velocity sensor according to Embodiment 5.

FIG. 25 is a schematic cross-sectional view of the angular velocity sensor along line 25-25 shown in FIG. 24.

FIG. 26 shows phases of signals of the angular velocity sensor according to Embodiment 6.

FIG. 27 is a circuit diagram of a drive circuit connected to the angular velocity sensor according to Embodiment 6.

FIG. 31 shows phases of signals of the angular velocity sensor according to Embodiment 6.

DETAIL DESCRIPTION OF PREFERRED EMBODIMENTS

Exemplary Embodiment 1

Figure 1:
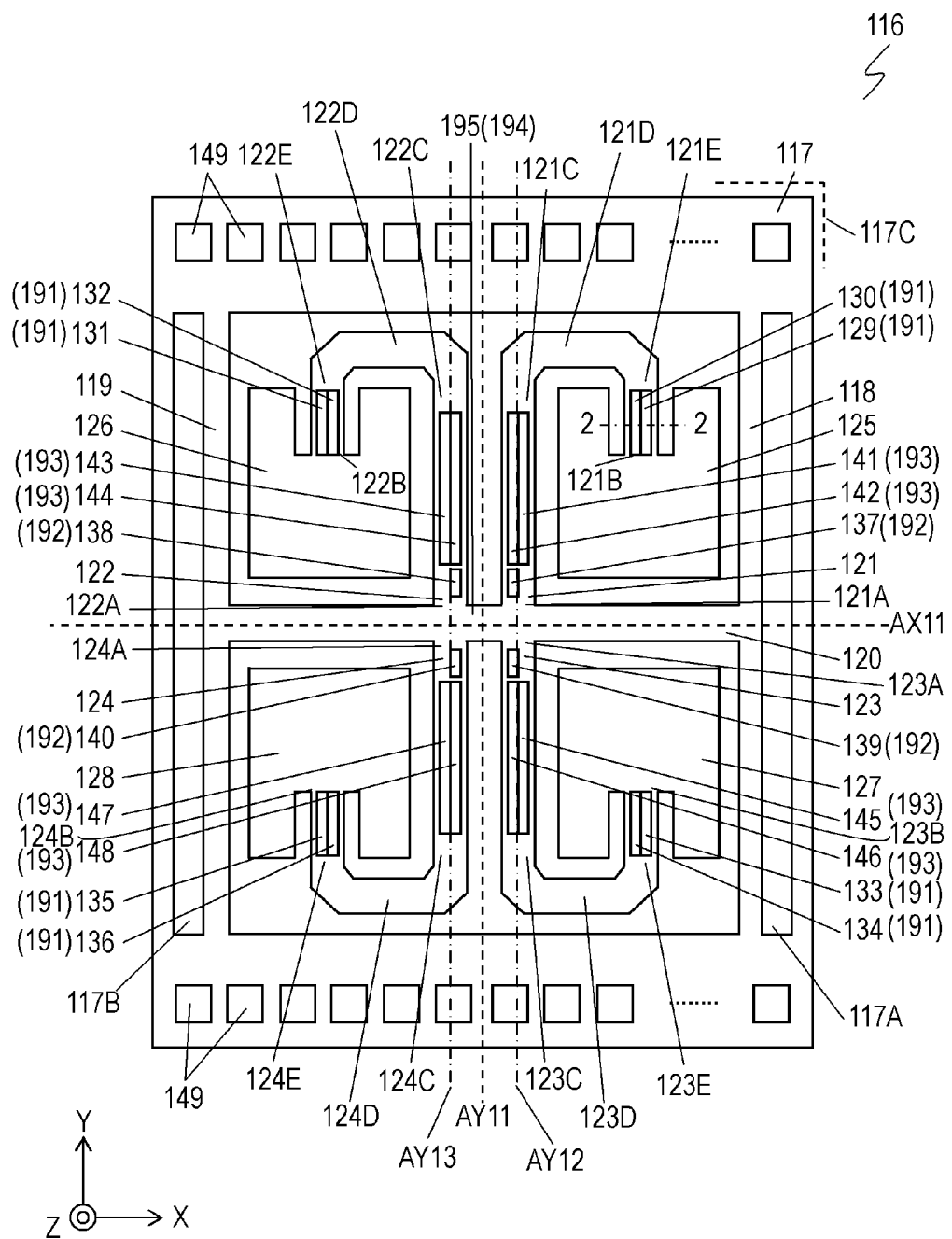
FIG. 1 is a plan view of an angular velocity sensor according to Exemplary Embodiment 1 of the present invention.

FIG. 1 is a plan view of angular velocity sensor 116 according to Exemplary Embodiment 1 of the present invention.

In FIG. 1, an X-axis, a Y-axis, and a Z-axis that are perpendicular to each other are defined. An X-Y plane that contains the X-axis and the Y-axis is defined. Angular velocity sensor 116 includes support body 117 having a frame shape, longitudinal beams 118 and 119 supported by support body 117 and extending in parallel to the Y-axis, lateral beam 120 supported between longitudinal beams 118 and 119, weights 125 to 128, retaining portion 195 provided in middle portion 194 of lateral beam 120, arms 121 to 124 supported by retaining portion 195, drive unit 191 for driving arms 121 to 124 to vibrate the arms in parallel to the X-Y plane, monitor unit 192 for detecting displacements of arms 121 to 124 in a direction parallel to the X-Y plane, and detector unit 193 for detecting displacements of weights 125 to 128 in a direction of the X-axis, a direction of the Y-axis, or a direction of the Z-axis. Detector unit 193 detects displacements of arms 121 to 124 in directions of the X-axis, the Y-axis, and the Z-axis. Support body 117 is configured to be fixed to an object 117C to which an angular velocity is applied. Arm 121 has one end 121A supported by retaining portion 195 and another end 121B connected to weight 125, and extends in a positive direction of the Y-axis from one end 121A. Arm 122 has one end 122A supported by retaining portion 195 and another end 122B connected to weight 126, and extends in the positive direction of the Y-axis from one end 122A. Arm 123 has one end 123A supported by retaining portion 195 and another end 123B connected to weight 127, and extends in a negative direction of the Y-axis from one end 123A. Arm 124 has one end 124A supported by retaining portion 195 and another end 124B connected to weight 128, and extends in the negative direction of the Y-axis from one end 124A. Drive unit 191 includes drive elements 129 to 136 for causing arms 121 to 124 to vibrate in parallel to the X-Y plane. Monitor unit 192 includes monitor elements 137 to 140 for detecting displacements of arms 121 to 124 in a direction of X-axis, respectively. Detector unit 193 includes detector elements 141 to 148 for detecting displacements of weights 125 to 128 in a direction of the Y-axis or in a direction of the Z-axis. Retaining portion 195 is connected to support body 117 via lateral beam 120 and longitudinal beams 118 and 119. Support body 117 has slit 117A formed therein between support body 117 and longitudinal beam 118, and has slit 117B formed therein between support body 117 and longitudinal beam 119. Slits 117A and 117B provided between support body 117 and longitudinal beams 118 and 119 prevents a stress from transmitting to lateral beam 120 and arms 121 and 124 when angular velocity sensor 116 is bonded to a package, bottom cover, or the like.

Support body 117 does not necessarily have slit 117A or 117B formed therein. In this case, a part of support body 117 functions as longitudinal beams 118 and 119. This configuration reduces the width of angular velocity sensor 116 in a direction of the X-axis.

Support body 117 is a fixed member that supports longitudinal beams 118 and 119, and is fixed to a package having angular velocity sensor 116 accommodated therein with using another support member, such as adhesive. Plural electrode pads 149 are disposed on an outer periphery of support body 117. Electrode pads 149 are individually wired and connected electrically with drive elements 129 to 136, monitor elements 137 to 140 and detector elements 141 to 148.

Longitudinal beams 118 and 119 extend in parallel to the Y-axis with both ends thereof connected to support body 117 to be suspended by support body 117. Longitudinal beams 118 and 119 can warp in directions of Z-axis. In addition, longitudinal beams 118 and 119 are substantially symmetrical to each other with respect to axis AY11 parallel to the Y-axis. This structure enables both longitudinal beams 118 and 119 to warp with substantially equal amplitudes in responsive to an angular velocity applied to angular velocity sensor 116.

Lateral beam 120 extends in parallel to the X-axis with one end thereof connected to a substantially middle position of longitudinal beam 118, and another end connected to a substantially middle position of longitudinal beam 119 such that lateral beam 120 can warp in directions of Z-axis.

Arm 121 has substantially a J-shape that includes elongated portion 121C extending in the positive direction of the Y-axis from one end 121A connected to retaining portion 195, elongated portion 121D extending in the positive direction of the X-axis from elongated portion 121C, and elongated portion 121E extending in the negative direction of the Y-axis from elongated portion 121D. Another end 121B is an end of elongated portion 121E, and is connected with weight 125.

Arm 122 also has substantially a J-shape that includes elongated portion 122C extending in the positive direction of the Y-axis from one end 122A connected to retaining portion 195, elongated portion 122D extending in the negative direction of the X-axis from elongated portion 122C, and elongated portion 122E extending in the negative direction of the Y-axis from elongated portion 122D. Another end 122B is an end of elongated portion 122E, and is connected with weight 126.

Arm 123 has substantially a J-shape that includes elongated portion 123C extending in the negative direction of the Y-axis from one end 123A connected to retaining portion 195, elongated portion 123D extending in the positive direction of the X-axis from elongated portion 123C, and elongated portion 123E extending in the positive direction of the Y-axis from elongated portion 123D. Another end 123B is an end of elongated portion 123E, and is connected with weight 127.

Arm 124 has substantially a J-shape that includes elongated portion 124C extending in the negative direction of the Y-axis from one end 124A connected to retaining portion 195, elongated portion 124D extending in the negative direction of the X-axis from elongated portion 124C, and elongated portion 124E extending in the positive direction of the Y-axis from elongated portion 124D. Another end 124B is an end of elongated portion 124E, and is connected with weight 128.

Arms 121 to 124 can warp in directions of the X-axis, the Y-axis, and the Z-axis.

Arms 121 and 122 are symmetrical to each other with respect to axis AY11 parallel to the Y-axis. Arms 123 and 124 are symmetrical to each other with respect to the axis AY11. Arms 121 and 123 are symmetrical to each other with respect to axis AX11 parallel to the X-axis. Arms 122 and 124 are symmetrical to each other with respect to the AX11. This structure enables all arms 121 to 124 to warp with substantially equal amplitudes responsive to an angular velocity applied to angular velocity sensor 116.

Support body 117, longitudinal beams 118 and 119, lateral beam 120, and arms 121 to 124 may be made of piezoelectric material, such as crystal, $LiTaO_3$, or $LiNbO_3$, or of a non-piezoelectric material, such as silicon, diamond, fused quartz, alumina, or GaAs. When being made of silicon, angular velocity sensor 116 may have a very small size by a micromachining technique, and can be integrated with integrated circuit (IC) that composes circuits.

Support body 117, longitudinal beams 118 and 119, lateral beam 120, and arms 121 to 124 may be formed individually with different materials or the same material, and then, they can be assembled together. Alternatively, they may be formed integrally with a single material. Support body 117, longitudinal beams 118 and 119, lateral beam 120, and arms 121 to 124 can be manufactured efficiently when a single and same material is used because they can be formed by a single process of dry etching or wet etching.

Drive elements 129 to 136 drive and displace arms 121 to 124 in a direction of X-axis. Drive elements 129 to 136 according to Embodiment 1 utilize a piezoelectric method with piezoelectric elements, such as lead zirconate titanate (PZT), however, may utilize an electrostatic method with capacitances between electrodes.

FIG. 2 is a schematic cross-sectional view of drive elements 129 and 130 along line 2-2 shown in FIG. 1. Drive element 129 includes piezoelectric element 129B sandwiched between lower electrode 129A and upper electrode. Drive element 130 includes piezoelectric element 130B sandwiched between lower electrode 130A and upper electrode 130C. Drive elements 129 and 130 are provided on an upper surface of arm 121. In other words, drive elements 129 and 130 includes lower electrodes 129A and 130A provided on the upper surface of arm 121, piezoelectric elements 129B and 130B provided on lower electrodes 129A and 130A, and upper electrodes 129C and 130C provided on piezoelectric elements 129B and 130B, respectively. Lower electrodes 129A and 130A and Upper electrodes 129C and 130C may be made of platinum (Pt), gold (Au), aluminum (Al), alloy containing mainly these metals, or oxide of these metals. Lower electrodes 129A and 130A may preferably be made of platinum (Pt) is used for bottom electrodes 129A and 130A that can promote an orientation of the PZT, i.e., the material of piezoelectric elements 129B and 130B into a single direction. Upper electrodes 129A and 130C may preferably be made of gold (Au). Gold exhibits very low deterioration in resistance over time, thus providing angular velocity sensor 116 reliably. According to this embodiment, both lower electrodes 129A and 130A are at a reference potential, so that arm 121 can vibrate in directions of the X-axis by applying an alternating-current (AC) driving voltage to upper electrodes 129C and 130C. Alternatively, an AC driving voltage may be applied to lower electrodes 129A and 130A and upper electrodes 129C and 130C. This operation enables arm 121 to vibrate more efficiently. Drive elements 131 to 136 have a structure similar to that of drive elements 129 and 130, and are provided on upper surfaces of arms 122 to 124, respectively. Drive elements 129 to 136 are formed on arms 121 to 124 at sides close to weights 125 to 128, i.e., on elongated portions 121E to 124E, as shown in FIG. 1. This structure ensures sufficient areas of portions of arms 121 to 124 at sides close to lateral beam 120 to dispose detector elements 141 to 148 thereon. If, on the other hand, drive elements 129 to 136 are disposed to the other sides of arms 121 to 124 close to lateral beam 120, i.e., on elongated portions 121C to 124C, drive elements 129 to 136 can drive arms 121 to 124 to vibrate more efficiently. This arrangement can provide drive elements 129 to 136 with a large size, and accordingly increases amplitude of vibration of arms 121 to 124, thereby increasing sensitivity of angular velocity sensor 116.

FIG. 3 shows phases of driving signals applied to drive elements 129 to 136 and phases of vibration of arms 121 to 124. Driving signals having the same phase (+) are applied to drive elements 129, 131, 133, and 135, while driving signals having opposite phase (−) to drive elements 129, 131, 133, and 135 are applied to drive elements 130, 132, 134, and 136. This causes arms 121 and 123 to vibrate in the direction of the X-axis with the same phase (+) while arms 122 and 124 to vibrate in the direction of the X-axis in the opposite phase (−) to the phase of the vibration of arms 121 and 123.

Monitor elements 137 to 140 detect displacements of arms 121 to 124 in the direction of the X-axis, and output monitor signals according to the displacements. Monitor elements 137 to 140 according to Embodiment 1 utilizes a piezoelectric method with piezoelectric elements. However, the monitor elements may utilize an electrostatic method with capacitances between the electrodes.

Each of monitor elements 137 to 140 includes piezoelectric elements sandwiched between a lower electrode and an upper electrode, and are provided on the upper surfaces of arms 121 to 124, similarly to drive elements 129 and 130 shown in FIG. 2. Monitor elements 137 to 140 are disposed at positions to produce monitor signals having the same phases as the vibrations of arms 121 to 124 shown in FIG. 3. Specifically, monitor elements 137 to 140 are provided on arms 121 to 124 at sides close to lateral beam 120, i.e., on elongated portions 121C to 124C as shown in FIG. 1. This structure enables monitor elements 137 to 140 to detect efficiently deformations of arms 121 to 124 according to the displacements while having a small size. The sizes of monitor elements 137 to 140 are preferably smaller than those of detector elements 141 to 148 to ensure spaces for disposing detector elements 141 to 148.

Detector elements 141 to 148 detect displacements of arms 121 to 124 in directions of the Y-axis or in directions of the Z-axis. Detector elements 141 to 148 utilize a piezoelectric method with piezoelectric elements, but may utilize an electrostatic method with capacitances between the electrodes.

Each of detector elements 141 to 148 includes a piezoelectric element sandwiched between a lower electrode and an upper electrode, is and provided on the upper surfaces of arms 121 to 124, similarly to drive elements 129 and 130 shown in FIG. 2. Detector elements 141 to 148 are provided on arms 121 to 124 at sides close to lateral beam 120, i.e., on elongated portions 121C to 124C, as shown in FIG. 1. This structure enables detector elements 141 to 148 to efficiently detect the displacements. In this case, detector elements 141 to 148 have large sizes, accordingly increasing sensitivity of angular velocity sensor 116. On the other hand, detector elements 141 to 148 may be disposed on the respective other sides of arms 121 to 124 near weights 125 to 128, i.e., on elongated portions 121E to 124E, thereby ensuring spaces for drive elements 129 to 136 disposed on arms 121 to 124 at the sides close to lateral beam 120.

Figure 34:
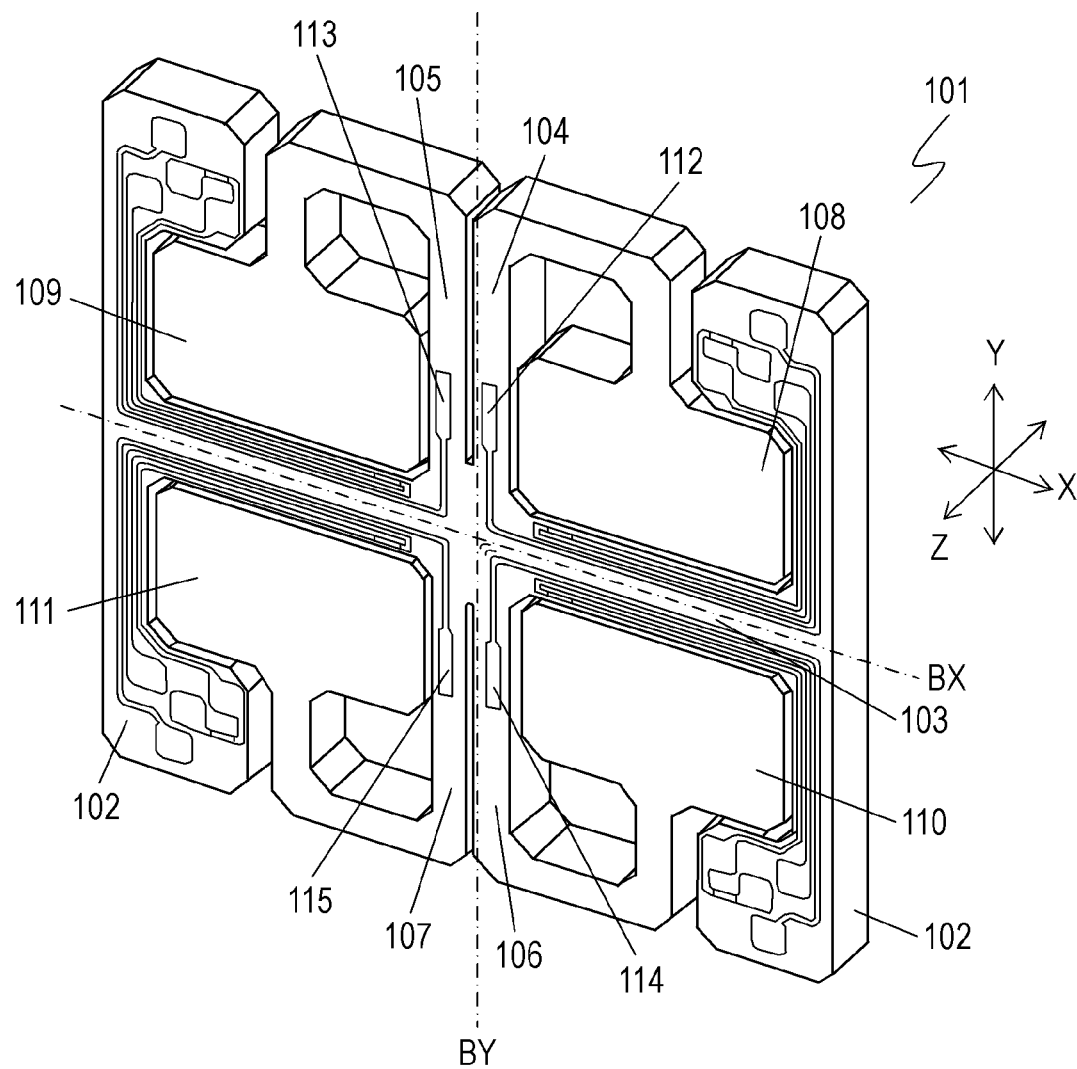
FIG. 34 is a perspective view of a conventional angular velocity sensor.

Conventional angular velocity sensor 101 shown in FIG. 34 may not cancel undesired signals attributable to external disturbances, such as acceleration or impacts, and may not detect an angular velocity accurately since detector elements 114 and 115 are not symmetrical to each other with respect to axis BY parallel to the Y-axis and axis BX parallel to the X-axis.

Detector elements 141 and 143 are symmetrical to each other with respect to axis AY11 parallel to the Y-axis, and detector elements 142 and 144 are symmetrical to each other with respect to the axis AY11. Similarly, detector elements 145 and 147 are symmetrical to each other with respect to the axis AY11, and detector elements 146 and 148 are symmetrical to each other with respect to the axis AY11. Detector elements 141 and 145 are symmetrical to each other with respect to axis AX11 parallel to the X-axis, and detector elements 142 and 146 are symmetrical to each other with respect to the axis AX11. Similarly, detector elements 143 and 147 are symmetrical to each other with respect to the axis AX11, and detector elements 144 and 148 are symmetrical to each other with respect to the axis AX11. The structure in which detector unit 193 includes detector elements 141 to 148 symmetrical with respect to both the axis AY11 and the axis AX11 allows angular velocity sensor 116 to cancel undesired signals attributable to external disturbances, such as acceleration or impacts, and to detect an angular velocity accurately.

FIG. 4 is a circuit diagram of drive circuit 150 connected with angular velocity sensor 116. Electrode pads 149A to 149H, some of electrode pads 149, are electrically connected with drive elements 129 to 136. Electrode pads 149I to 149L, some of electrode pads 149, are electrically connected with monitor elements 137 to 140. Signal lines connected to electrode pads 149I to 149L are joined together at node 196. Monitor signals which are currents output from electrode pads 149I to 149L are summed at node 196 and input to IV converter 151 that converts the currents into a voltage. Automatic gain controller (AGC) 152 adjusts this voltage to cause the voltage has a constant amplitude, and outputs the adjusted voltage. Filter 153 removes unnecessary frequency components from the voltage output from AGC 152. A voltage output from filter 152 is inverse-amplified by drive amplifier 154 and supplied to electrode pads 149B, 149D, 149F, and 149H. The driving signal output from the drive amplifier 154 is inverse-amplified by drive amplifier 155 and supplied to electrode pads 149A, 149C, 149E, and 149G. Drive circuit 150 thus supplies the driving signals having the phases shown in FIG. 3 to drive elements 129 to 136 to cause arms 121 to 124 to vibrate in the phases shown in FIG. 3.

Figure 5A:
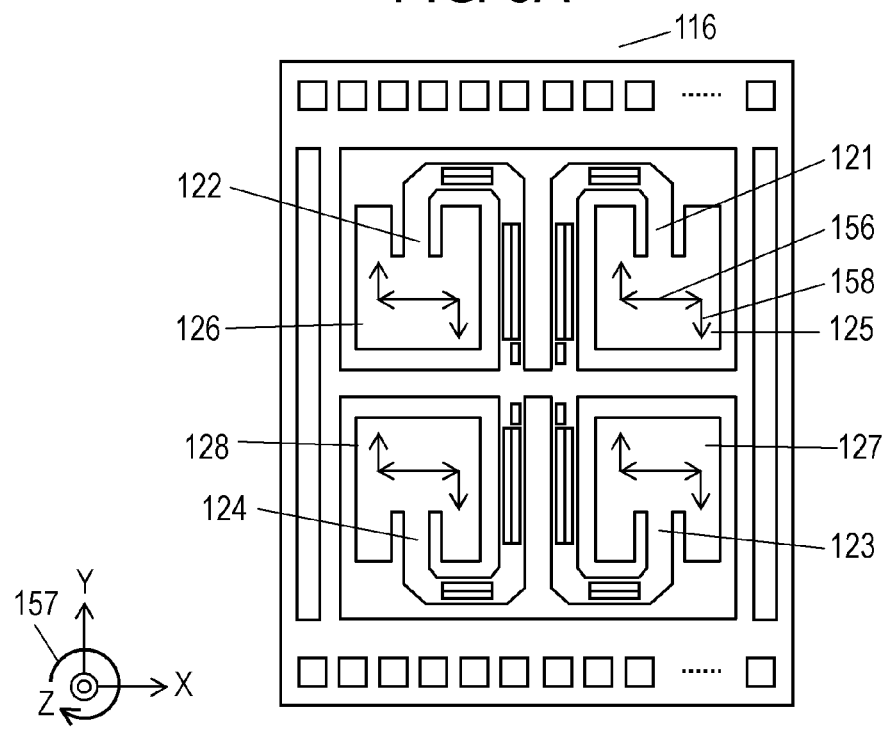
FIG. 5A is a schematic plan view of the angular velocity sensor according to Embodiment 1 for illustrating an operation of the sensor.
Figure 5B:
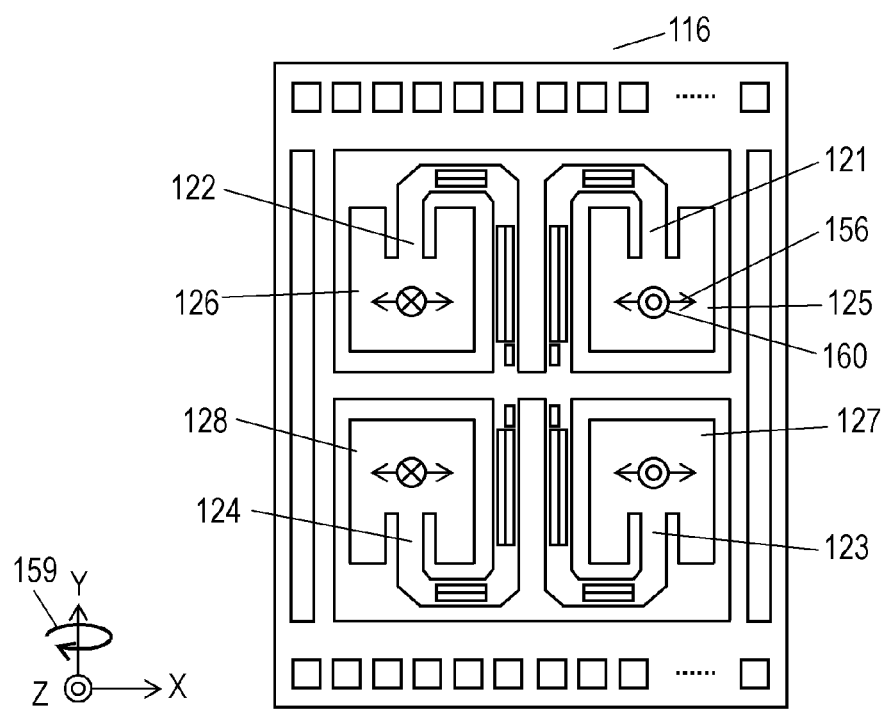
FIG. 5B is a schematic plan view of the angular velocity sensor according to Embodiment 1 for illustrating an operation of the sensor.

FIGS. 5A and 5B are schematic plan views of angular velocity sensor 116 for illustrating an operation for when an angular velocity is applied.

FIG. 5A is a plan view of angular velocity sensor 116 while detecting angular velocity 157 about the Z-axis. Driving signals supplied from drive circuit 150 to drive elements 129 to 136 produce drive vibrations 156 of a specific vibrating frequency on weights 125 to 128 in a direction of the X-axis. Angular velocity 157 about the Z-axis applied to angular velocity sensor 116 produces a Coriolis force in a direction of the Y-axis which produces detection vibrations 158 on weights 125 to 128. Detection vibrations 158 produced on weights 125 to 128 in the direction of the Y-axis cause arms 121 to 124 to vibrate in the direction of the X-axis. Arms 121 and 123 vibrate in the phase opposite to the phase of vibration of arms 122 and 124, and thus, the detection vibrations of arms 121 and 123 have phases opposite to phases of the detection vibrations of arms 122 and 124.

Detection signals output from detector elements 141 to 148 due to detection vibrations 158 have the same frequency as drive vibrations 156, and have amplitudes according to angular velocity 157. Amount ωz of angular velocity 157 can be detected by measuring the amplitudes of these detection signals.

FIG. 5B is a plan view of angular velocity sensor 116 while detecting angular velocity 159 about the Y-axis. Angular velocity 159 about the Y-axis produces a Coriolis force which produces detection vibrations 160 on weights 125 to 128 in a direction of the Z-axis. Arms 121 and 123 vibrate in the phase opposite to the phase of the vibration of arms 122 and 124, and thus, the phase of the detection vibrations of arms 121 and 123 are opposite to the phases of the detection vibrations of arms 122 and 124.

Detection signals output from detector elements 141 to 148 due to detection vibrations 160 have the same frequency as drive vibrations 156, and have amplitudes according to angular velocity 159. Amount ωy of angular velocity 159 can be detected by measuring the amplitudes of these detection signals.

Figures 6, 7:
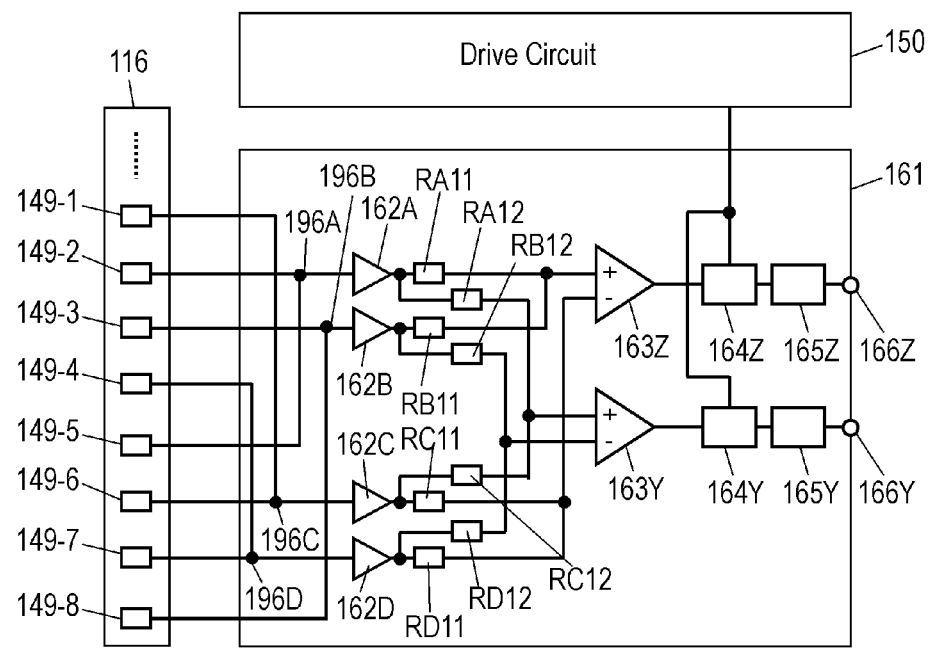
FIG. 6 shows phases of signals of the angular velocity sensor according to Embodiment 1.
FIG. 7 is a circuit diagram of a detector circuit connected to the angular velocity sensor according to Embodiment 1.

FIG. 6 shows signals S101 to S108 output from detector elements 141 to 148, respectively, and more specifically, phases of components attributed to the driving signals, phases of components attributed to angular velocities about the X-axis, the Y-axis, and the Z-axis, and phases of components attributed to accelerations in the directions of the X-axis, Y-axis, and the Z-axis contained in the signals S101 to S108.

According to FIG. 6, the amount ωz of angular velocity 157 about the Z-axis is expressed as the following formula 1:

$$\omega z=\{(S102+S105)+(S103+S108)\}-\{(S101+S106)+(S104+S107)\} \quad \text{(Formula 1)}$$

The amount ωy of angular velocity 159 about the Y-axis is expressed as the following formula 2:

$$\omega y=\{(S102+S105)+(S101+S106)\}-\{(S103+S108)+(S104+S107)\} \quad \text{(Formula 2)}$$

In FIG. 6, the amounts of the components of signals S101 to S108 attributed to the driving signals, for instance, are equal to each other due to the symmetrical structure of each of units 191 to 193. In addition, amplitudes of the components signals S101 to S108 attributed to the angular velocity about the X-axis are equal to each other, and the same equality also applies to other angular velocities and accelerations. When phases of the components attributed to the drive vibrations are substituted for the symbols in formula 1 to obtain the amount ωz of angular velocity 157, the value of formula 1 becomes zero. In other words, if certain amounts of components attributed to the driving signals appear in detector elements 141 to 148 as undesired signals, these signals are cancelled with one another as a result of calculation in formula 1. Similarly, the value of formula 1 becomes zero when phases of the components attributed to the angular velocity about the X-axis are substituted into formula 1. The value of formula 1 becomes zero when phases of the components attributed to the angular velocity about the Y-axis are substituted into formula 1. The value of formula 1 becomes zero when phases of the components attributed to the acceleration in the direction of the X-axis are substituted into formula 1. The value of formula 1 becomes zero when phases of the components attributed to the acceleration in the direction of the Y-axis are substituted into formula 1. The value of formula 1 also becomes zero when phases of the components attributed to the acceleration in the direction of the Z-axis are substituted into formula 1. That is, undesired signals, such as angular velocities about the other axes and accelerations can be cancelled with one another as a result of calculation in formula 1

When the phases of the components attributed to the driving signals are substituted in the same manner for the symbols in formula 2 for obtaining an amount ωy of angular velocity 159 about the Y-axis, the value of formula 2 becomes zero. The value of formula 2 also becomes zero when phases of the components attributed to the angular velocity about the X-axis are substituted into formula 2. The value of formula 2 becomes zero when phases of the components attributed to the angular velocity about the Z-axis are substituted into the formula 2. The value of formula 2 becomes zero when phases of the components attributed to the acceleration in the direction of the X-axis are substituted into formula 2. The value of formula 2 becomes zero when phases of the components attributed to the acceleration in the direction of the Y-axis are substituted into formula 2. The value of formula 2 becomes zero when phases of the components attributed to the acceleration in the direction of the Z-axis are substituted into formula 2. That is, undesired signals, such as drive vibrations, angular velocities about the other axes, and accelerations, can be cancelled with one another as a result of calculation in formula 2.

Thus, detector unit 193 includes detector elements 141 to 148 disposed symmetrically with respect to both the axis AY11 parallel to the Y-axis and the axis AX11 parallel to the X-axis. This arrangement cancels the undesired signal components caused by drive vibrations, angular velocities about the other axes, and accelerations.

FIG. 7 is a circuit diagram of detector circuit 161 connected with angular velocity sensor 116. Electrode pads 149-1 to 149-8, some of electrode pads 149, are electrically connected with detector elements 141 to 148, respectively. Detector circuit 161 shown in FIG. 7 performs the calculation of formulae 1 and 2.

A signal line connected with electrode pad 149-2 and a signal line connected with electrode pad 149-5 are connected with each other at node 196A. Signal S102 which is a current output from electrode pad 149-2 and signal S105 which is a current output from electrode pad 149-5 are summed up at node 196A and input to IV converter 162A which converts the summed currents into a voltage and output the voltage. A signal line connected with electrode pad 149-3 and a signal line connected with electrode pad 149-8 are connected with each other at node 196B. Signal S103 which is a current output from electrode pad 149-3 and signal S108 which is a current output from electrode pad 149-8 are summed up at node 196B and input to IV converter 162B which converts the summed currents into a voltage and outputs the voltage. A signal line connected with electrode pad 149-1 and a signal line connected with electrode pad 149-6 are connected with each other at node 196C. Signal S101 which is a current output from electrode pad 149-1 and signal S106 which is a current output from electrode pad 149-6 are summed up at node 196C and input to IV converter 162C which converts the summed current to a voltage, and outputs the voltage. A signal line connected with electrode pad 149-4 and a signal line connected with electrode pad 149-7 are connected with each other at node 196D. Signal S104 which is a current output from electrode pad 149-4 and signal S107 which is a current output from electrode pad 149-7 are summed up at node 196D and input to IV converter 162D which converts the summed currents into a voltage, and outputs the voltage.

The amount ωz of angular velocity 157 about the Z-axis is calculated by the following structure. An output from IV converter 162A and an output from IV converter 162B are connected to a node via resistors RA11 and RB11, respectively. An output from IV converter 162C and an output from IV converter 162D are connected to a node through resistors RC11 and RD11, respectively. These nodes are connected to inputs of differential amplifier 163Z. According to Embodiment 1, resistors RA11 and RB11 have the same resistance, and resistors RC11 and RD11 have the same resistance. Detector circuit 164Z detects a signal output from differential amplifier 163Z with using a signal output from drive circuit 150. Low-pass filter 165Z filters the detected signal to extract a signal. The extract signal is output from output terminal 166Z as the amount ωz of angular velocity 157 about the Z-axis.

The amount ωy of angular velocity 159 about the Y-axis is calculated by the following structure. An output from IV converter 162A and an output from IV converter 162C are connected to a node via resistors RA12 and RC12, respectively. An output from IV converter 162B and an output from IV converter 162D are connected to a node via resistors RB12 and RD12, respectively. These nodes are connected to inputs of differential amplifier 163Y. According to Embodiment 1, resistors RA12 and RC12 have the same resistance, and resistors RB12 and RD12 have eth same resistance. Detector circuit 164Y detects a signal output from differential amplifier 163Y with using the signal output from drive circuit 150. Low-pass filter 165Y filters the detected signal to extract a signal. The extract signal is output from output terminal 166Y as the amount ωy of angular velocity 159 about the Y-axis.

As shown in FIGS. 6 and 7, the connections of electrode pads 149-1 to 149-8 cancel the components attributed to the driving signals before being input to IV converters 162A to 162D. The components attributed to the driving signals can be thus cancelled before the signals are amplified by IV converters 162A to 162D.

The components attributed to angular velocity 159 about the Y-axis are cancelled out in the connections of IV converters 162A to 162D before being input to differential amplifier 163Z for detecting angular velocity 157 about the Z-axis. The components attributed to angular velocity 159 about the Y-axis can be thus cancelled before the signal is amplified by IV converter 163Z.

The components attributed to angular velocity 157 are cancelled out in the connections of IV converters 162A to 162D before being input to differential amplifier 163Y for detecting angular velocity 159 about the Y-axis.

Furthermore, the components attributed to the acceleration in the direction of the X-axis are cancelled out before being input to IV converters 162A to 162D. The components attributed to the acceleration in the direction of the Y-axis can be cancelled out before being amplified by differential amplifier 163Z.

As discussed above, detector unit 193 including detector elements 141 to 148 symmetrical with respect to both the axis AX11 parallel to the X-axis and the axis AY11 parallel to the Y-axis can cancel out the undesired signals, such as the components attributed to the driving signals, the components attributed to the angular velocities about the other axes, and the components attributed to the acceleration.

Detector elements 141 and 142 are symmetrical to each other with respect to axis AY12 parallel to the Y-axis. Detector elements 143 and 144 are symmetrical to each other with respect to axis AY13 parallel to the axis AY11. The axis AY13 is symmetrical to the axis AY12 with respect to the axis AY11. Detector elements 145 and 146 are symmetrical to each other with respect to the axis AY12, and detector elements 147 and 148 are symmetrical to each other with respect to the axis AY13.

Figure 8:
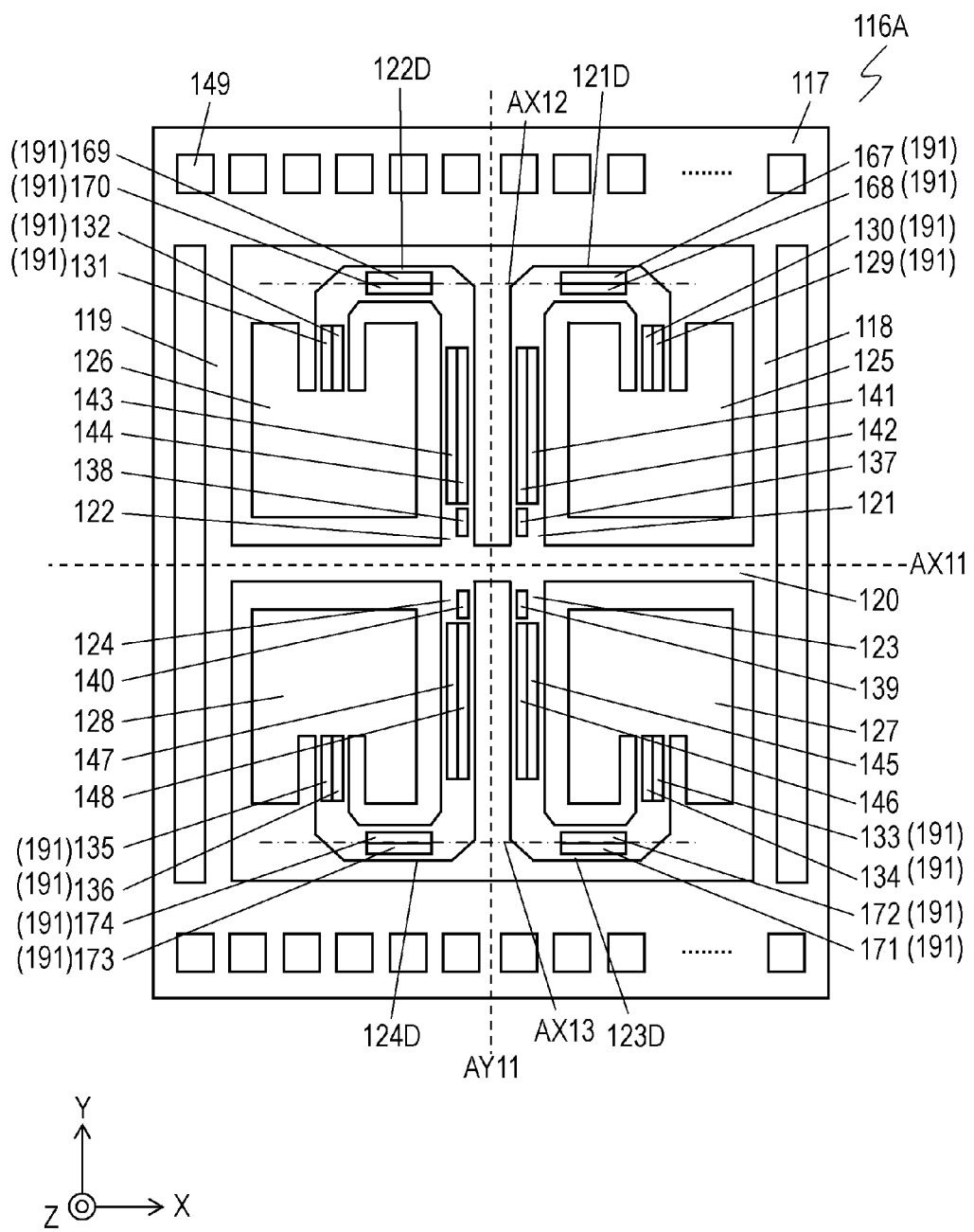
FIG. 8 is a plan view of another angular velocity sensor according to Embodiment 1.

FIG. 8 is a plan view of another angular velocity sensor 116A according to Embodiment 1. In FIG. 8, components identical to those of angular velocity sensor 116 shown in FIG. 1 are denoted by the same reference numerals. Drive unit 191 of angular velocity sensor 116A shown in FIG. 8 further includes drive elements 167 and 168 disposed on elongated portion 121D of arm 121, drive elements 169 and 170 disposed on elongated portion 122D of arm 122, drive elements 171 and 172 disposed on elongated portion 123D of arm 123, and drive elements 173 and 174 disposed on elongated portion 124D of arm 124. This structure can drive arms 121 to 124 to vibrate also in directions of the Y-axis, thereby allowing angular velocity sensor 116A to detect an angular velocity about the X-axis. In this case, an amount ωx of the angular velocity about the X-axis can be obtained by the formula 3:

$$\omega x=(S101+S102+S103+S104)-(S105+S106+S107+S108) \quad \text{(Formula 3)}$$

Drive elements 167 and 168 are symmetrical to each other with respect to axis AX12 parallel to the axis AX11. Drive elements 169 and 170 are symmetrical to each other with respect to the axis AX12. Drive elements 171 and 172 are symmetrical to each other with respect to axis AX13 parallel to the axis AX11. The axis AX13 is symmetrical to the axis AX12 with respect to the axis AX11. Drive elements 173 and 174 are symmetrical to each other with respect to the axis AX13.

Drive elements 167 and 171 are symmetrical to each other with respect to the axis AX11. Drive elements 168 and 172 are symmetrical to each other with respect to the axis AX11. Drive elements 169 and 173 are symmetrical to each other with respect to the axis AX11. Drive elements 170 and 174 are symmetrical to each other with respect to the axis AX11.

Drive elements 167 and 169 are symmetrical to each other with respect to the axis AY11. Drive elements 168 and 170 are symmetrical to each other with respect to the axis AY11. Drive elements 171 and 173 are symmetrical to each other with respect to the axis AY11. Drive elements 172 and 174 are symmetrical to each other with respect to the axis AY11.

Drive elements 167 to 174 enables sensor 116A to detect an angular velocity about any axis of the three axes simultaneously while cancelling undesired signals, such as components attributed to the driving signals, components attributed to angular velocities about the other axes, and components attributed to acceleration during detecting the angular velocity about the axis.

In angular velocity sensors 116 and 116A according to Embodiment 1, arms 121 to 124 connected weights 125 to 128 are supported by lateral beam 120 which is supported by longitudinal beams 118 and 119 which are supported by support body 117. This structure can detect an angular velocity about any axis of the three axes simultaneously while having a disadvantage that the structure may accept an influenced, such as an acceleration or impacts. The canceling of the components attributable to angular velocities about the other axes and accelerations is effective particularly for this structure of angular velocity sensors 116 and 116A.

Exemplary Embodiment 2

Figure 9:
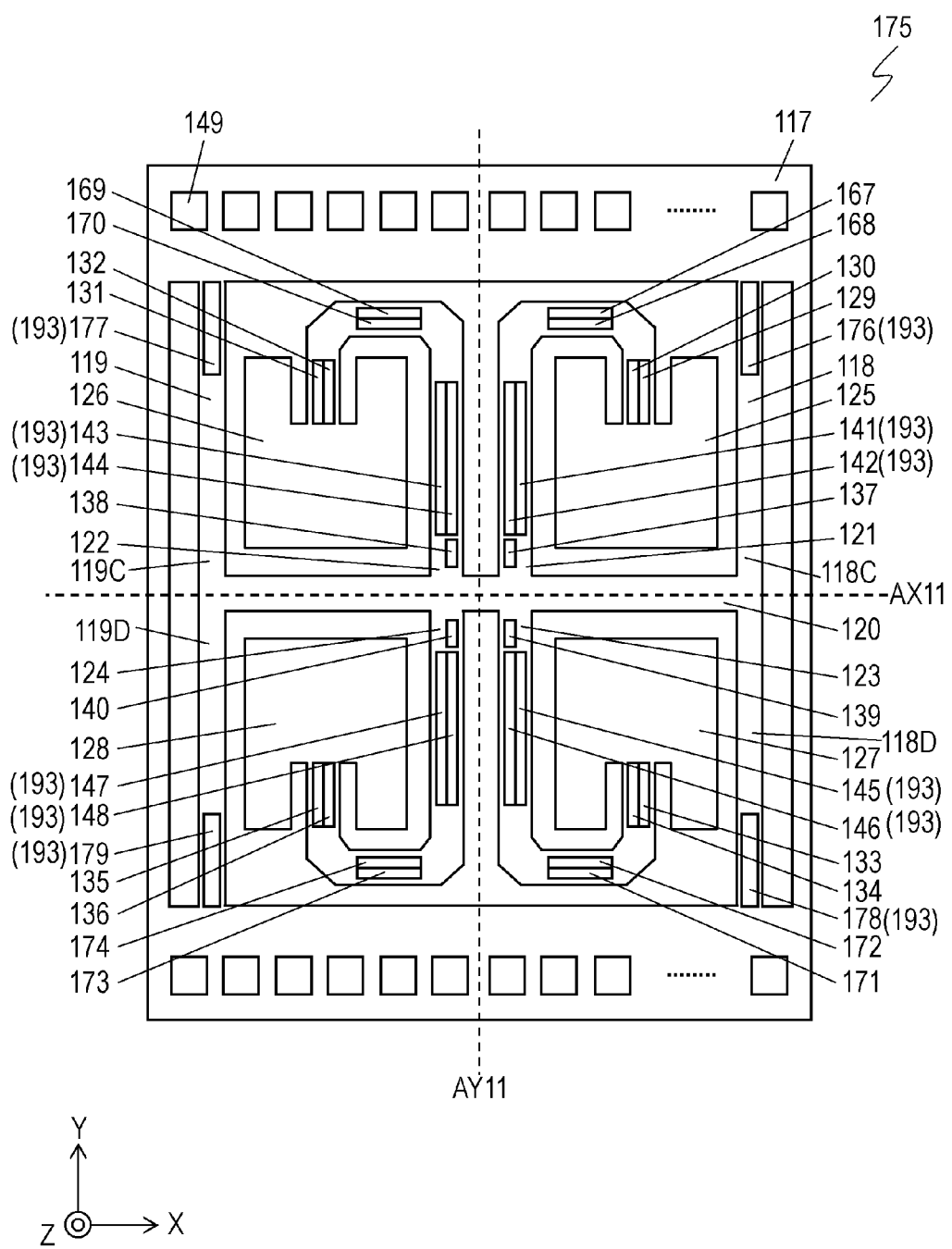
FIG. 9 is a plan view of an angular velocity sensor according to Exemplary Embodiment 2 of the invention.

FIG. 9 is a plan view of angular velocity sensor 175 according to Exemplary Embodiment 2. In FIG. 9, components identical to those of angular velocity sensor 116A according to Embodiment 1 shown in FIG. 8 are denoted by the same reference numerals. In angular velocity sensor 175 shown in FIG. 9, detector unit 193 further includes detector elements 176 and 178 provided on longitudinal beam 118, and detector elements 177 and 179 provided on longitudinal beam 119.

Longitudinal beam 118 includes portion 118C facing weight 125 and arm 121, and includes portion 118D facing weight 127 and arm 123. Detector element 176 is disposed on one side of longitudinal beam 118, or portion 118C close to arm 121. Detector element 178 is disposed on the other side of longitudinal beam 118, or portion 118D close to arm 123. Similarly, longitudinal beam 119 includes portion 119C facing weight 126 and arm 122, and includes portion 119D facing weight 128 and arm 124. Detector element 177 is disposed on one side of longitudinal beam 119, or portion 119C close to arm 122, and detector element 179 is disposed on the other side of longitudinal beam 119, or portion 119D close to arm 124.

Detector element 176 and detector element 177 are symmetrical to each other with respect to the axis AY11. Detector element 178 and detector element 179 are symmetrical to each other with respect to the axis AY11. Detector element 176 and detector element 178 are symmetrical to each other with respect to the axis AX11. Detector element 177 and detector element 179 are symmetrical to each other with respect to the axis AX11.

Detector elements 176 to 179 allows angular velocity sensor 175 to detect an angular velocity exerted on angular velocity sensor 175 about the X-axis.

FIG. 10 shows signals S109 to S112 output from detector elements 176 to 179, respectively, and more specifically, phases of components attributed to the driving signals, phases of components attributed to angular velocities about the X-axis, the Y-axis, and the Z-axis, and phases of components attributed to accelerations in the directions of the X-axis, Y-axis, and Z-axis contained in the signals S109 to S112.

According to FIG. 10, an amount ωx2 of the angular velocity about the X-axis can be obtained by formula 4:

$$\omega x2=(S109+S111)-(S110+S112) \quad \text{(Formula 4)}$$

In FIG. 10, amplitudes of the components attributed to the angular velocity about the X-axis, for instance, are the same in all signals S109 to S112 due to the symmetrical structure of each of units 191 to 193, and the same equality also applies to other angular velocities and accelerations. When components attributed to the driving signals, phases of the components attributed to the angular velocities about the Y-axis and the Z-axis and phases of the accelerations in the directions of the X-axis, the Y-axis, and the Z-axis are substituted into formula 4 to obtain the amount ωx2 of the angular velocity about the X-axis, the value of formula 4 becomes zero. In other words, undesired signals of certain amounts of components attributed to the angular velocities about the other axes and accelerations can be cancelled as a result of calculation in formula 4.

Detector elements 176 to 179 provided on longitudinal beams 118 and 119 are located at positions symmetrical to one another with respect to the axis AY11 and the axis AX11. This arrangement prevents components attributable to the driving signals from appearing in detector elements 176 to 179, as shown in FIG. 10. This structure can avoid the influence of the driving signals without even summing up the signals output from the detection electrodes. In angular velocity sensor 116 shown in FIG. 1, the components attributable to the driving signals cannot be cancelled even by the calculations according to formulae 1, 2, and 3 when, for instance, any of detector elements 141 to 148 are located at their positions deviated on support body 117. In angular velocity sensor 175 according to Embodiment 2, on the other hand, the influence of the components attributable to the driving signals can be eliminated even if any of detector elements 176 to 179 are deviated from their positions on support body 117. The same advantage is similarly effective on other undesired signals such that the components attributed to an angular velocity about the Y-axis, an angular velocity about the Z-axis, and an acceleration in the direction of the Y-axis can be cancelled so as not to appear in detector elements 141 to 148.

As discussed above, detector elements 176 to 179 symmetrical to each other with respect to both the axis AY11 and the axis AX11 can eliminate or cancel the undesired signals, such as the components attributed to the driving signals, the angular velocities about the other axes, and the acceleration.

Exemplary Embodiment 3

Figure 11:
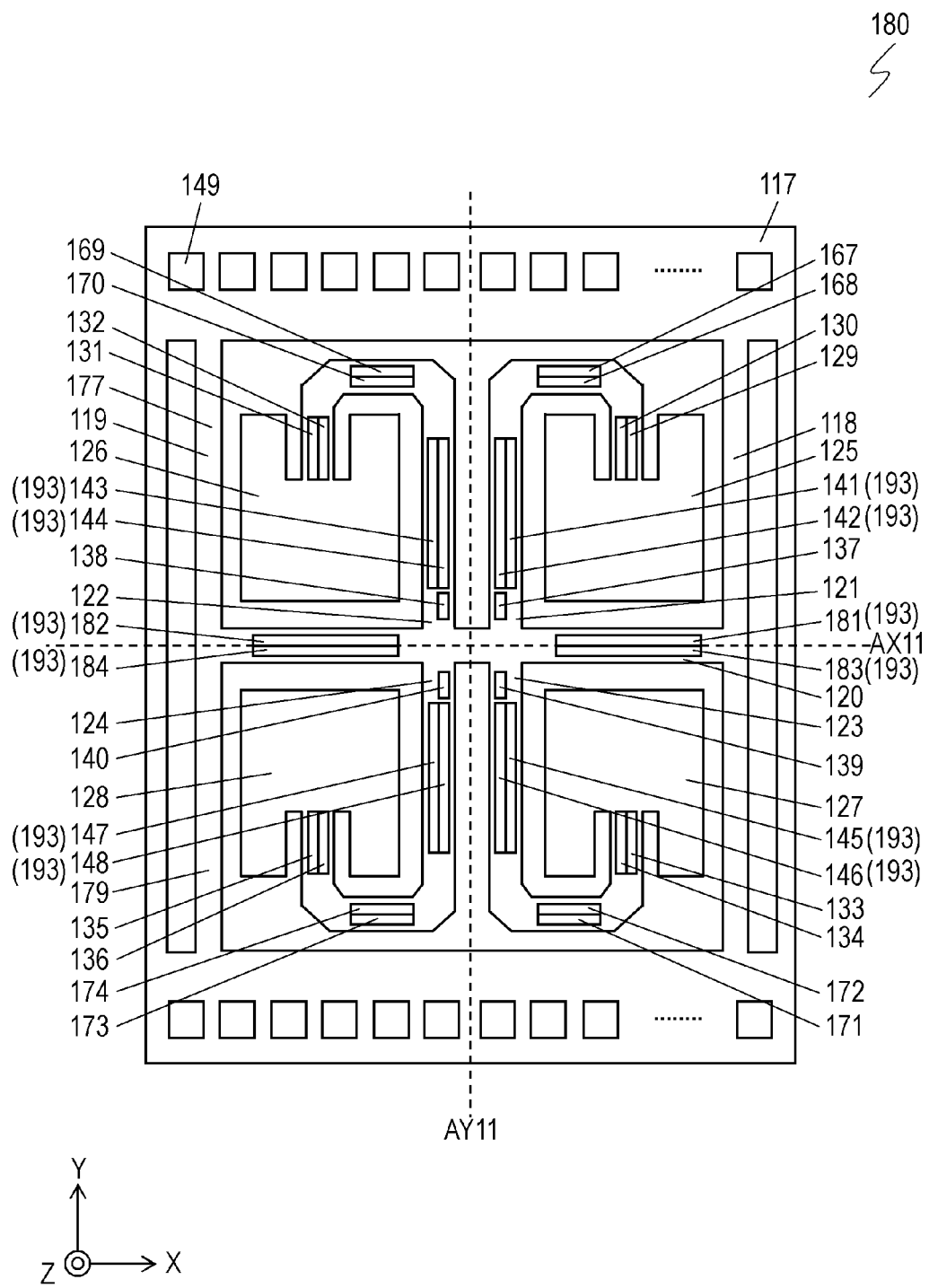
FIG. 11 is a block diagram of an angular velocity sensor according to Exemplary Embodiment 3 of the invention.

FIG. 11 is a plan view of angular velocity sensor 180 according to Exemplary Embodiment 3. In FIG. 11, components identical to those of angular velocity sensor 116A according to Embodiment 1 shown in FIG. 8 are denoted by the same reference numerals. In angular velocity sensor 180 according to Embodiment 3, detector unit 193 further includes detector elements 181 to 184 provided on lateral beam 120.

Detector element 181 is provided on a side of lateral beam 120 close to arm 121. Detector element 182 is provided on a side of lateral beam 120 close to arm122. Detector element 183 is provided on a side of lateral beam 120 close to arm123. Detector element 184 is provided on a side of lateral beam 120 close to arm 124.

Detector elements 181 and 182 are symmetrical to each other with respect to axis AY11. Detector elements 183 and 184 are symmetrical to each other with respect to axis AY11. Detector elements 181 and 183 are symmetrical to each other with respect to axis AX11. Detector elements 182 and 184 are symmetrical to each other with respect to axis AX11.

Angular velocity sensor 180 can detect an angular velocity about the Y-axis with using detector elements 181 to 184.

FIG. 12 shows signals S113 to S116 output from respective detector elements 181 to 184, and more specifically, phases of components attributed to driving signals, phases of components attributed to angular velocities about the X-axis, the Y-axis, and the Z-axis, and phases of components attributed to accelerations in the directions of the X-axis, the Y-axis, and the Z-axis.

As shown in FIG. 12, an amount ωy2 of angular velocity about the Y-axis can be obtained by formula 5:

$$\omega y2=(S113+S115)-(S114+S116) \quad \text{(Formula 5)}$$

In FIG. 12, amplitudes of the components attributed to the angular velocity about the X-axis, for instance, are the same in all signals S113 to S116 sue to the symmetrical structure of each of units 191 to 193, and the same equality also applies to other angular velocities and accelerations. When phases of the components attributed to the driving signals, phases of the components attributed to the angular velocities about the Y-axis and the Z-axis and phases of the accelerations in the directions of the X-axis, Y-axis and Z-axis are substituted into formula 5 to obtain amount ωy2 of the angular velocity about the Y-axis, the value of formula 5 becomes zero. In other words, undesired signals of these components attributed to the angular velocities about the other axes and accelerations can be cancelled out, as a result of calculation in formula 5.

Detector elements 181 to 184 are provided on lateral beam 120 at positions symmetrical to one another with respect to the axis AY11 and the axis AX11. This arrangement prevents a component attributable to the driving signal from appearing in any of detector elements 181 to 184, as shown in FIG. 12. This structure eliminates the influence of driving signals with the undesired signals without even summing up the signals output from the plurality of detection electrodes. Angular velocity sensor 116 shown in FIG. 1 can cancel out the components attributable to the driving signals even after the calculations according to formulae 1, 2, and 3, if any of detector elements 141 to 148, for instance, have their positions deviated on support body 117. In angular velocity sensor 180 according to Embodiment 3, on the other hand, the influence of the components attributable to the driving signals can be eliminated even when any of detector elements 181 to 184 are in positions deviated on support body 117. The same advantage becomes similarly effective on other undesired signals such that the components attributed to an angular velocity about the X-axis, an angular velocity about the Z-axis, and an acceleration in the direction of the X-axis can be cancelled so as not to appear in detector elements 181 to 184.

Exemplary Embodiment 4

Figure 13:
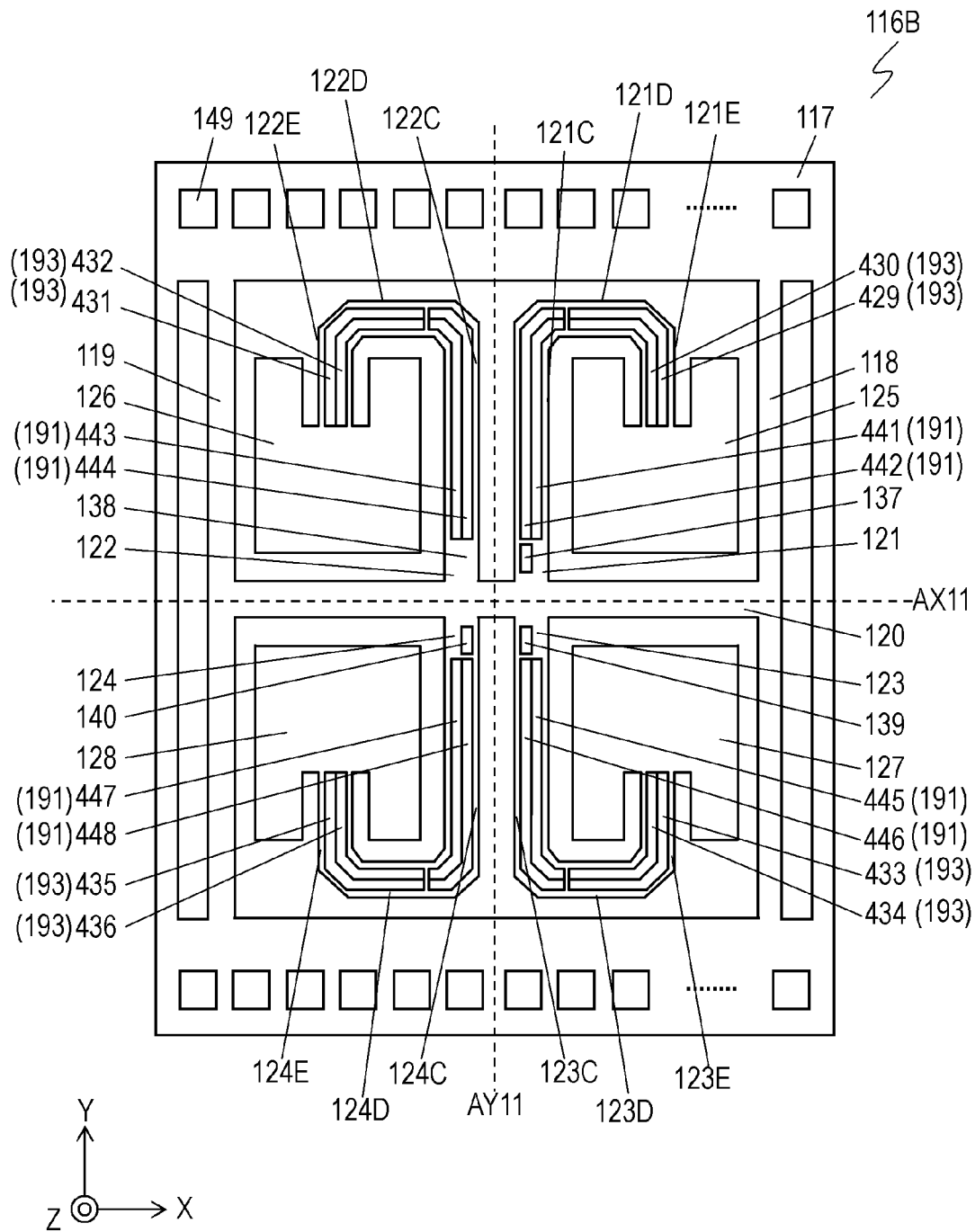
FIG. 13 is a plan view of an angular velocity sensor according to Exemplary Embodiment 4.

FIG. 13 is a plan view of angular velocity sensor 116B according to Exemplary Embodiment 4. In FIG. 13, components identical to those of angular velocity sensor 116 according to Embodiment 1 shown in FIG. 1 are denoted by the same reference numerals. In angular velocity sensor 116B shown in FIG. 13, drive unit 191 includes drive elements 441 to 448 instead of drive elements 129 to 136 of angular velocity sensor 116 shown in FIG. 1. In addition, detector unit 193 of angular velocity sensor 116B includes detector elements 429 to 436 instead of detector elements 141 to 148.

Drive unit 191 is symmetrical with respect to both axis AX11 and axis AY11. Drive elements 441 and 443 are symmetrical to each other with respect to the axis AY11. Drive elements 442 and 444 are symmetrical to each other with respect to the axis AY11. Drive elements 445 and 447 are symmetrical to each other with respect to the axis AY11. Drive elements 446 and 448 are symmetrical to each other with respect to the axis AY11. In addition, drive elements 441 and 445 are symmetrical to each other with respect to the axis AX11. Drive elements 442 and 446 are symmetrical to each other with respect to the axis AX11. Drive elements 443 and 447 are symmetrical to each other with respect to the axis AX11. Drive elements 444 and 448 are symmetrical to each other with respect to the axis AX11.

Detector unit 193 is symmetrical with respect to both the axis AX11 and the axis AY11. Detector elements 429 and 431 are symmetrical to each other with respect to the axis AY11. Detector elements 430 and 432 are symmetrical to each other with respect to the axis AY11. Detector elements 433 and 435 are symmetrical to each other with respect to the axis AY11. Detector elements 434 and 436 are symmetrical to each other with respect to the axis AY11. Detector elements 429 and 433 are symmetrical to each other with respect to the axis AX11. Detector elements 430 and 434 are symmetrically with respect to the axis AX11. Detector elements 431 and 435 are symmetrical to each other with respect to the axis AX11. Detector elements 432 and 436 are symmetrical to each other with respect to the axis AX11.

Both drive elements 441 and 442 extend on elongated portions 121C and 121D along arm 121. Both drive elements 443 and 444 extend on elongated portions 122C and 122D along arm 122. Both drive elements 445 and 446 extend on elongated portions 123C and 123D along arm 123. Both drive elements 447 and 448 extend on elongated portions 124C and 124D along arm 124.

Both detector elements 429 and 430 extend on elongated portions 121D and 121E along arm 121. Both detector elements 431 and 432 extend on elongated portions 122D and 122E along arm 122. Both detector elements 433 and 434 extend on elongated portions 123D and 123E along arm 123. Both detector elements 435 and 436 extend on elongated portions 124D and 124E along arm 124.

Figure 14:
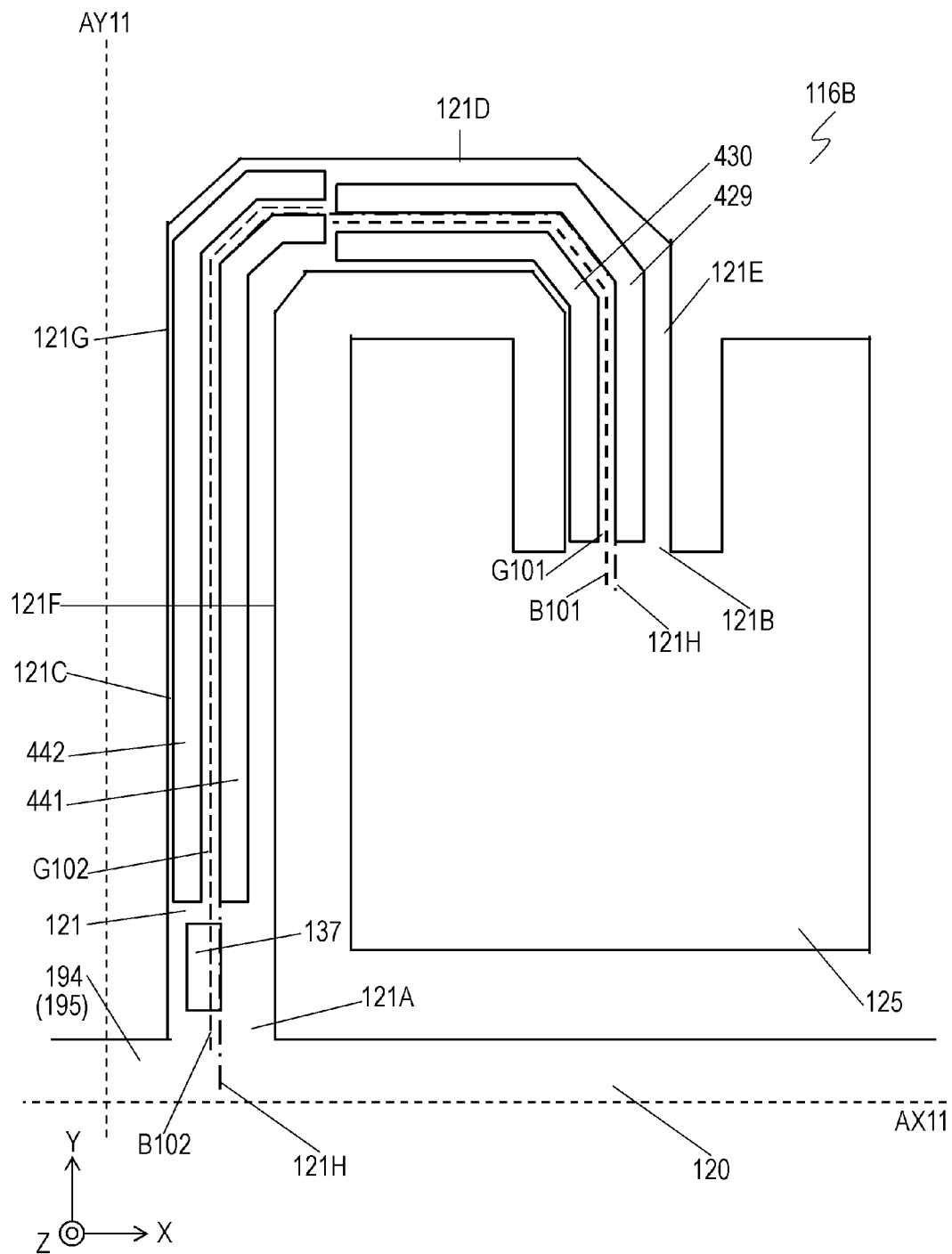
FIG. 14 is an enlarged plan view of the angular velocity sensor of the fourth embodiment.

FIG. 14 is an enlarged plan view of angular velocity sensor 116B, specifically illustrating arm 121 and weight 125. Arm 121 has substantially a J-shape that extends from one end 121A connected with retaining portion 195 provided in middle portion 194 of lateral beam 120 to another end 121B connected to weight 125. A surface of arm 121 having detector elements 429 and 430, drive elements 441 and 442, and monitor element 137 provided thereon extends substantially along a J-shape. This surface has inner circumferential edge 121F extending along an inner periphery of the J-shape, outer circumferential edge 121G extending along an outer periphery of the J-shape, and center line 121H extending along the middle between inner circumferential edge 121F and outer circumferential edge 121G.

Detector element 429 extending through elongated portions 121D and 121E of arm 121 is closer to outer circumferential edge 121G of the J-shape of arm 121 than detector element 430 extending through elongated portions 121D and 121E of arm 121 is. In other words, detector element 430 is closer to inner circumferential edge 121F of the J-shape of arm 121 than detector element 429 is. Middle line B101 extending along arm 121 at the center of gap G101 between detector elements 429 and 430 is defined. That is, detector element 429 is disposed between middle line B101 and outer circumferential edge 121G, and detector element 430 is disposed between middle line B101 and inner circumferential edge 121F. Detector elements 429 and 430 preferably extend along arm 121 with constant widths.

That is, arm 121 is curved in the J-shape to have inner circumferential edge 121F extending an inner circumferential side of the J-shape, outer circumferential edge 121G extending an outer circumferential side of the J-shape, and center line 121H extending along the middle between inner circumferential edge 121F and outer circumferential edge 121G. Detector elements 429 and 430 are extended along arm 121. Middle line B101 extending along the middle between detector elements 429 and 430 is located between center line 121H and inner circumferential edge 121F. Detector elements 429 and 430 may extend to be curved along arm 121.

Similarly to arm 121, arm 122 is curved in the J-shape to have an inner circumferential edge extending along an inner circumferential side of the J-shape, an outer circumferential edge extending along an outer circumferential side of the J-shape, and a center line extending along the middle between the inner circumferential edge and the outer circumferential edge. Detector elements 431 and 432 extend along arm 122. A middle line extending along the middle between detector elements 431 and 432 is located between the center line and the inner circumferential edge. Detector elements 431 and 432 may extend to be curved along arm 122.

Similarly to arm 121, arm 123 is curved in the J-shape to have an inner circumferential edge extending along an inner circumferential side of the J-shape, an outer circumferential edge extending along an outer circumferential side of the J-shape, and a center line extending along the middle between the inner circumferential edge and the outer circumferential edge. Detector elements 433 and 434 extend along arm 123. A middle line extending along the middle between detector elements 433 and 434 is located between the center line and the inner circumferential edge mentioned above. Detector elements 433 and 434 may extend to be curved along arm 123.

Similarly to arm 121, arm 124 is curved in the J-shape to have an inner circumferential edge extending along an inner circumferential side of the J-shape, an outer circumferential edge extending along an outer circumferential side of the J-shape, and a center line extending along the middle between the inner circumferential edge and the outer circumferential edge. Detector elements 435 and 436 extend along arm 124. A middle line extending along the middle between detector elements 435 and 436 is located between the center line and the inner circumferential edge. Detector elements 435 and 436 may extend to be curved along arm 124.

Figure 15:
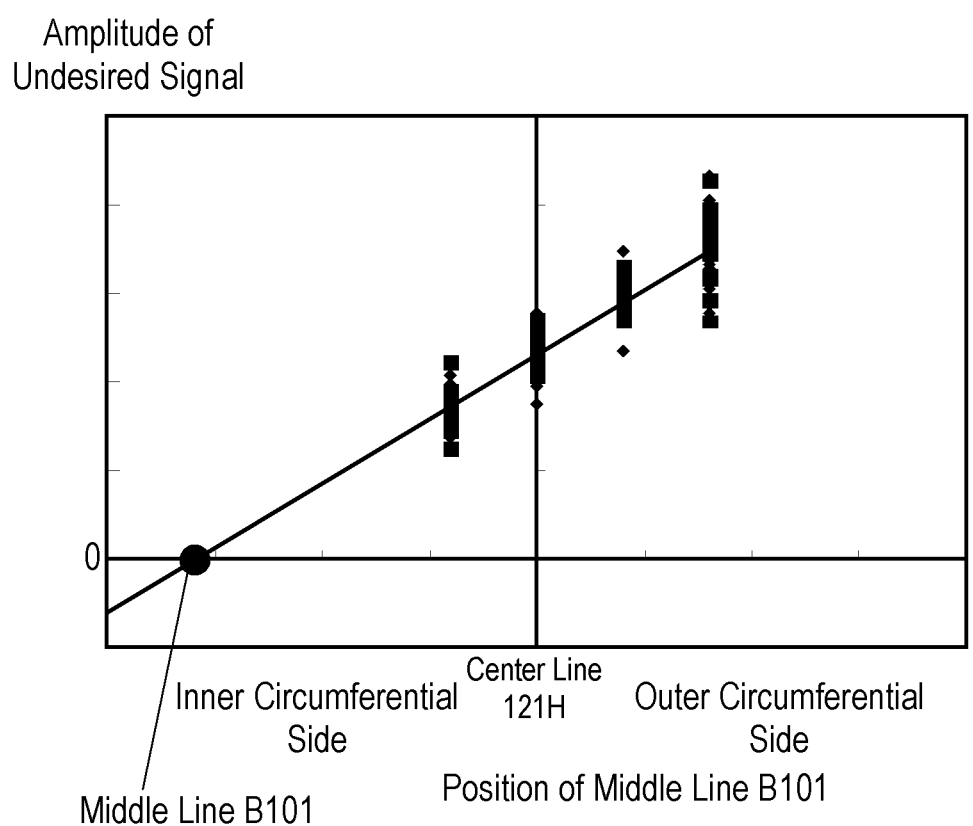
FIG. 15 shows amplitude of an undesired signal in relation to the position of a middle line extending along a middle between detector elements of the angular velocity sensor according to Embodiment 4.

FIG. 15 shows the amount of undesired signal output from detector circuit 161 shown in FIG. 7 in relation to the position of middle line B101 between detector elements 429 and 430 provided on arm 121. As shown in FIG. 15, signals output from detector elements 429 and 430 can be balanced and the amount of the undesired signal become 0 by deviating middle line B101 toward the inner circumferential edge from center line 121H of arm 121. On arm 121 according to Embodiment 4 has a width of 100 µm, middle line B101 deviates by 1% (about 1 µm) toward the inner circumferential edge from center line 121H. The amounts of undesired signals of other arms 122 to 124 can be reduced to zero by arranging other detector elements 431 to 436 similarly to detector elements 429 and 430 on arm 121.

Drive elements 441 and 442 provided on arm 121 extend along arm 121, as shown in FIG. 14. Contrary to middle line B101, middle line B102 extending along the center of gap G102 between drive elements 441 and 442 is located between center line 121H and outer circumferential edge 121G. This arrangement provides arm 121 with a balanced vibration with the same amplitude of displacements to both positive and negative directions of the X-axis. On arm 121 according to Embodiment 4 having a width of 100 µm, middle line B102 deviates by 1% (about 1 µm) toward the outer circumferential edge from center line 121H. Both drive elements 441 and 442 preferably extended along arm 121 with constant widths. Drive elements 441 and 442 preferably extend to be curved along arm 121.

Drive elements 443 and 444 provided on arm 122 extend along arm 122, similarly to arm 121. A middle line extending along the center of a gap between drive elements 443 and 444 is located between a center line and an outer circumferential edge of arm 122. This arrangement provides arm 122 with a balanced vibration with the same amplitude of displacements to both positive and negative directions of the X-axis. On arm 122 according to Embodiment 4 having a width of 100 µm, the middle line deviates by 1% (about 1 µm) toward the outer circumferential edge from the center line. Drive elements 443 and 444 preferably extend along arm 122 with constant widths. Drive elements 443 and 444 preferably extend to be curved along arm 122.

Drive elements 445 and 446 provided on arm 123 extend along arm 123, similarly to arm 121. A middle line extending along the center of a gap between drive elements 445 and 446 is located between the center line and an outer circumferential edge of arm 123. This arrangement provides arm 123 with a balanced vibration with the same amplitude of displacements to both positive and negative directions of the X-axis. On arm 123 according to Embodiment 4 having a width of 100 µm, the middle line deviates by 1% (about 1 µm) toward the outer circumferential edge from the center line. Both drive elements 445 and 446 preferably extend along arm 123 with constant widths. Drive elements 445 and 446 preferably extend to be curved along arm 123.

Drive elements 447 and 448 provided on arm 124 extend along arm 124, similarly to arm 121. A middle line extending along the center of a gap between drive elements 447 and 448 is located between a center line and an outer circumferential edge of arm 124. This arrangement provides arm 124 with a balanced vibration with the same amplitude of displacements to both positive and negative directions of the X-axis. On arm 124 according to Embodiment 4 having a width of 100 µm, the middle line deviates by 1% (about 1 µm) toward the outer circumferential edge from the center line. Both drive elements 447 and 448 preferably extend along arm 124 with constant widths. Drive elements 447 and 448 preferably extend to be curved along arm 124.

Exemplary Embodiment 5

Figure 16:
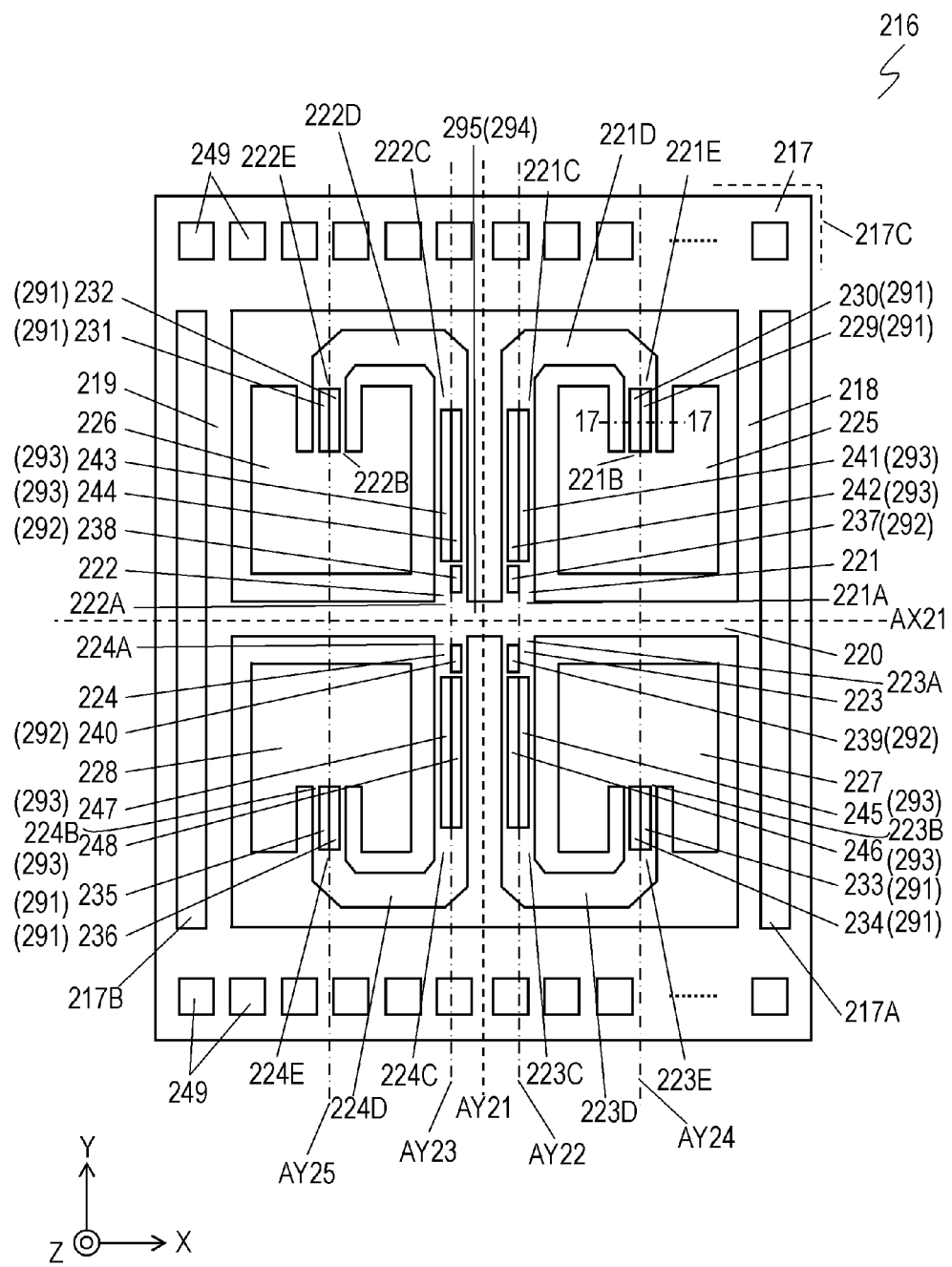
FIG. 16 is a plan view of an angular velocity sensor according to Exemplary Embodiment 5 of the invention.

FIG. 16 is a plan view of angular velocity sensor 216 according to Exemplary Embodiment 5 of the present invention.

In FIG. 16, an X-axis, a Y-axis, and a Z-axis that are perpendicular to each other are defined. An X-Y plane that contains the X-axis and the Y-axis is defined. Angular velocity sensor 216 includes support body 217 having a frame shape, longitudinal beams 218 and 219 supported by support body 217 and extending in parallel to the Y-axis, lateral beam 220 supported between longitudinal beams 218 and 219, weights 225 to 228, retaining portion 295 provided in middle portion 294 of lateral beam 220, arms 221 to 224 supported by retaining portion 295, drive unit 291 for driving arms 221 to 224 to vibrate the arms in parallel to the X-Y plane, monitor unit 292 for detecting displacements of arms 221 to 224 in a direction parallel to the X-Y plane, and detector unit 293 for detecting displacements of weights 225 to 228 in a direction of the X-axis, a direction of the Y-axis, or a direction of the Z-axis. Detector unit 293 detects displacements of arms 221 to 224 in directions of the X-axis, the Y-axis, and the Z-axis. Support body 217 is configured to be fixed to an object 217C to which an angular velocity is applied. Arm 221 has one end 221A supported by retaining portion 295 and another end 221B connected to weight 225, and extends in a positive direction of the Y-axis from one end 221A. Arm 222 has one end 222A supported by retaining portion 295 and another end 222B connected to weight 226, and extends in the positive direction of the Y-axis from one end 222A. Arm 223 has one end 223A supported by retaining portion 295 and another end 223B connected to weight 227, and extends in a negative direction of the Y-axis from one end 223A. Arm 224 has one end 224A supported by retaining portion 295 and another end 224B connected to weight 228, and extends in the negative direction of the Y-axis from one end 224A. Drive unit 291 includes drive elements 229 to 236 for causing arms 221 to 224 to vibrate in parallel to the X-Y plane. Monitor unit 292 includes monitor elements 237 to 240 for detecting displacements of arms 221 to 224 in a direction of X-axis, respectively. Detector unit 293 includes detector elements 241 to 248 for detecting displacements of weights 225 to 228 in a direction of the Y-axis or in a direction of the Z-axis. Retaining portion 295 is connected to support body 217 via lateral beam 220 and longitudinal beams 218 and 219. Support body 217 has slit 217A formed therein between support body 217 and longitudinal beam 218, and has slit 217B formed therein between support body 217 and longitudinal beam 219. Slits 217A and 217B provided between support body 217 and longitudinal beams 218 and 219 prevents a stress from transmitting to lateral beam 220 and arms 221 and 224 when angular velocity sensor 216 is bonded to a package, bottom cover, or the like.

Support body 217 does not necessarily have slit 217A or 217B formed therein. In this case, a part of support body 217 functions as longitudinal beams 218 and 219. This configuration reduces the width of angular velocity sensor 216 in a direction of the X-axis.

Support body 217 is a fixed member that supports longitudinal beams 218 and 219, and is fixed to a package having angular velocity sensor 216 accommodated therein with using another support member, such as adhesive. Plural electrode pads 249 are disposed on an outer periphery of support body 217. Electrode pads 249 are individually wired and connected electrically with drive elements 229 to 236, monitor elements 237 to 240 and detector elements 241 to 248.

Longitudinal beams 218 and 219 extend in parallel to the Y-axis with both ends thereof connected to support body 217 to be suspended by support body 217. Longitudinal beams 218 and 219 can warp in directions of Z-axis. In addition, longitudinal beams 218 and 219 are substantially symmetrical to each other with respect to axis AY21 parallel to the Y-axis. This structure enables both longitudinal beams 218 and 219 to warp with substantially equal amplitudes in responsive to an angular velocity applied to angular velocity sensor 216.

Lateral beam 220 extends in parallel to the X-axis with one end thereof connected to a substantially middle position of longitudinal beam 218, and another end connected to a substantially middle position of longitudinal beam 219 such that lateral beam 220 can warp in directions of Z-axis.

Arm 221 has substantially a J-shape that includes elongated portion 221C extending in the positive direction of the Y-axis from one end 221A connected to retaining portion 295, elongated portion 221D extending in the positive direction of the X-axis from elongated portion 221C, and elongated portion 221E extending in the negative direction of the Y-axis from elongated portion 221D. Another end 221B is an end of elongated portion 221E, and is connected with weight 225.

Arm 222 also has substantially a J-shape that includes elongated portion 222C extending in the positive direction of the Y-axis from one end 222A connected to retaining portion 295, elongated portion 222D extending in the negative direction of the X-axis from elongated portion 222C, and elongated portion 222E extending in the negative direction of the Y-axis from elongated portion 222D. Another end 222B is an end of elongated portion 222E, and is connected with weight 226.

Arm 223 has substantially a J-shape that includes elongated portion 223C extending in the negative direction of the Y-axis from one end 223A connected to retaining portion 295, elongated portion 223D extending in the positive direction of the X-axis from elongated portion 223C, and elongated portion 223E extending in the positive direction of the Y-axis from elongated portion 223D. Another end 223B is an end of elongated portion 223E, and is connected with weight 227.

Arm 224 has substantially a J-shape that includes elongated portion 224C extending in the negative direction of the Y-axis from one end 224A connected to retaining portion 295, elongated portion 224D extending in the negative direction of the X-axis from elongated portion 224C, and elongated portion 224E extending in the positive direction of the Y-axis from elongated portion 224D. Another end 224B is an end of elongated portion 224E, and is connected with weight 228.

Arms 221 to 224 can warp in directions of the X-axis, the Y-axis, and the Z-axis.

Arms 221 and 222 are symmetrical to each other with respect to axis AY21 parallel to the Y-axis. Arms 223 and 224 are symmetrical to each other with respect to the axis AY21. Arms 221 and 223 are symmetrical to each other with respect to axis AX21 parallel to the X-axis. Arms 222 and 224 are symmetrical to each other with respect to the AX21. This structure enables all arms 221 to 224 to warp with substantially equal amplitudes responsive to an angular velocity applied to angular velocity sensor 216.

Support body 217, longitudinal beams 218 and 219, lateral beam 220, and arms 221 to 224 may be made of piezoelectric material, such as crystal, LiTaO$_3$, or LiNbO$_3$, or of a non-piezoelectric material, such as silicon, diamond, fused quartz, alumina, or GaAs. When being made of silicon, angular velocity sensor 216 may have a very small size by a micro-machining technique, and can be integrated with integrated circuit (IC) that composes circuits.

Support body 217, longitudinal beams 218 and 219, lateral beam 220, and arms 221 to 224 may be formed individually with different materials or the same material, and then, they can be assembled together. Alternatively, they may be formed integrally with a single material. Support body 217, longitudinal beams 218 and 219, lateral beam 220, and arms 221 to 224 can be manufactured efficiently when a single and same material is used because they can be formed by a single process of dry etching or wet etching.

Drive elements 229 to 236 drive and displace arms 221 to 224 in a direction of X-axis. Drive elements 229 to 236 according to Embodiment 5 utilize a piezoelectric method with piezoelectric elements, such as PZT, however, may utilize an electrostatic method with capacitances between electrodes.

FIG. 17 is a schematic cross-sectional view of drive elements 229 and 230 along line 17-17 shown in FIG. 16. Drive element 229 includes piezoelectric element 229B sandwiched between lower electrode 229A and upper electrode. Drive element 230 includes piezoelectric element 230B sandwiched between lower electrode 230A and upper electrode 230C. Drive elements 229 and 230 are provided on an upper surface of arm 221. In other words, drive elements 229 and 230 includes lower electrodes 229A and 230A provided on the upper surface of arm 221, piezoelectric elements 229B and 230B provided on lower electrodes 229A and 230A, and upper electrodes 229C and 230C provided on piezoelectric elements 229B and 230B, respectively. Lower electrodes 229A and 230A and Upper electrodes 229C and 230C may be made of platinum (Pt), gold (Au), aluminum (Al), alloy containing mainly these metals, or oxide of these metals. Lower electrodes 229A and 230A may preferably be made of platinum (Pt) is used for bottom electrodes 229A and 230A that can promote an orientation of the PZT, i.e., the material of piezoelectric elements 229B and 230B into a single direction. Upper electrodes 229A and 230C may preferably be made of gold (Au). Gold exhibits very low deterioration in resistance over time, thus providing angular velocity sensor 216 with high reliability. According to this embodiment, both lower electrodes 229A and 230A are at a reference potential, so that arm 221 can vibrate in directions of the X-axis by applying an alternating-current (AC) driving voltage to upper electrodes 229C and 230C. Alternatively, an AC driving voltage may be applied to lower electrodes 229A and 230A and upper electrodes 229C and 230C. This operation enables arm 221 to vibrate more efficiently. Drive elements 231 to 236 have a structure similar to that of drive elements 229 and 230, and are provided on upper surfaces of arms 222 to 224, respectively. Drive elements 229 to 236 are formed on arms 221 to 224 at sides close to weights 225 to 228, i.e., on elongated portions 221E to 224E, as shown in FIG. 16. This structure ensures sufficient areas of portions of arms 221 to 224 at sides close to lateral beam 220 to dispose detector elements 241 to 248 thereon. If, on the other hand, drive elements 229 to 236 are disposed to the other sides of arms 221 to 224 close to lateral beam 220, i.e., on elongated portions 221C to 224C, drive elements 229 to 236 can drive arms 221 to 224 to vibrate more efficiently. This arrangement can provide drive elements 229 to 236 with a large size, and accordingly increases amplitude of vibration of arms 221 to 224, thereby increasing sensitivity of angular velocity sensor 216.

Drive elements 229 and 230 are symmetrical to each other with respect to axis AY24 parallel to the axis AY21. Drive elements 231 and 232 are symmetrical to each other with respect to axis AY25 parallel to the axis AY21. The axis AY25 is symmetrical to the axis AY24 with respect to the axis AY21. Drive elements 233 and 234 are symmetrical to each other with respect to the axis AY24. Drive elements 235 and 236 are symmetrical to each other with respect to the axis AY25.

Drive elements 229 and 231 are symmetrical to each other with respect to the axis AY21. Drive elements 230 and 232 are symmetrical to each other with respect to the axis AY21. Drive elements 233 and 235 are symmetrical to each other with respect to the axis AY21. Drive elements 234 and 236 are symmetrical to each other with respect to the axis AY21.

Drive elements 229 and 233 are symmetrical to each other with respect to the axis AX21. Drive elements 230 and 234 are symmetrical to each other with respect to the axis AX21. Drive elements 231 and 235 are symmetrical to each other with respect to the axis AX21, and drive elements 232 and 236 are symmetrical to each other with respect to the axis AX21.

FIG. 18 shows phases of driving signals applied to drive elements 229 to 236 and phases of vibration of arms 221 to 224. Driving signals having the same phase (+) are applied to drive elements 229, 231, 233, and 235, while driving signals having opposite phase (−) to drive elements 229, 231, 233, and 235 are applied to drive elements 230, 232, 234, and 236. This causes arms 221 and 223 to vibrate in the direction of the X-axis with the same phase (+) while arms 222 and 224 to vibrate in the direction of the X-axis in the opposite phase (−) to the phase of the vibration of arms 221 and 223.

Monitor elements 237 to 240 detect displacements of arms 221 to 224 in the direction of the X-axis, and output monitor signals according to the displacements. Monitor elements 237 to 240 according to Embodiment 5 utilizes a piezoelectric method with piezoelectric elements. However, the monitor elements may utilize an electrostatic method with capacitances between the electrodes.

Each of monitor elements 237 to 240 includes piezoelectric elements sandwiched between a lower electrode and an upper electrode, and are provided on the upper surfaces of arms 221 to 224, similarly to drive elements 229 and 230 shown in FIG. 17. Monitor elements 237 to 240 are disposed at positions to produce monitor signals having the same phases as the vibrations of arms 221 to 224 shown in FIG. 18. Specifically, monitor elements 237 to 240 are provided on arms 221 to 224 at sides close to lateral beam 220, i.e., on elongated portions 221C to 224C as shown in FIG. 16. This structure enables monitor elements 237 to 240 to detect efficiently deformations of arms 221 to 224 according to the displacements while having a small size. The sizes of monitor elements 237 to 240 are preferably smaller than those of detector elements 241 to 248 to ensure spaces for disposing detector elements 241 to 248.

Detector elements 241 to 248 detect displacements of arms 221 to 224 in directions of the Y-axis or in directions of the Z-axis. Detector elements 241 to 248 utilize a piezoelectric method with piezoelectric elements, but may utilize an electrostatic method with capacitances between the electrodes.

Each of detector elements 241 to 248 includes a piezoelectric element sandwiched between a lower electrode and an upper electrode, is and provided on the upper surfaces of arms 221 to 224, similarly to drive elements 229 and 230 shown in FIG. 17. Detector elements 241 to 248 are provided on arms 221 to 224 at sides close to lateral beam 220, i.e., on elongated portions 221C to 224C, as shown in FIG. 16. This structure enables detector elements 241 to 248 to efficiently detect the displacements. In this case, detector elements 241 to 248 have large sizes, accordingly increasing sensitivity of angular velocity sensor 216. On the other hand, detector elements 241 to 248 may be disposed on the respective other sides of arms 221 to 224 near weights 225 to 228, i.e., on elongated portions 221E to 224E, thereby ensuring spaces for drive elements 229 to 236 disposed on arms 221 to 224 at the sides close to lateral beam 220.

As shown in FIG. 16, drive elements 229 and 231 are symmetrical to each other with respect to the axis AY21 parallel to the Y-axis. Drive elements 230 and 232 are symmetrical to each other with respect to the axis AY21. Drive elements 233 and 235 are symmetrical to each other with respect to the axis AY21. Drive elements 234 and 236 are symmetrical to each other with respect to the axis AY21. Drive elements 229 and 233 are symmetrical to each other with respect to the axis AX21 parallel to the X-axis. Drive elements 230 and 234 are symmetrical to each other with respect to the axis AX21. Drive elements 231 and 235 are symmetrical to each other with respect to the axis AX21. Drive elements 232 and 236 are symmetrical to each other with respect to the axis AX21. The structure in which detector unit 293 includes detector elements 241 to 248 symmetrical with respect to both the axis AY21 and the axis AX21 allows angular velocity sensor 216 to cancel undesired signals attributable to external disturbances, such as acceleration or impacts, and to detect an angular velocity accurately.

FIG. 19 is a circuit diagram of drive circuit 250 connected with angular velocity sensor 216. Electrode pads 249A to 249H, some of electrode pads 249, are electrically connected with drive elements 229 to 236. Electrode pads 249I to 249L, some of electrode pads 249, are electrically connected with monitor elements 237 to 240. Signal lines connected to electrode pads 249I to 249L are joined together at node 296. Monitor signals which are currents output from electrode pads 249I to 249L are summed at node 296 and input to IV converter 251 that converts the currents into a voltage. Automatic gain controller (AGC) 252 adjusts this voltage to cause the voltage has a constant amplitude, and outputs the adjusted voltage. Filter 253 removes unnecessary frequency components from the voltage output from AGC 252. A voltage output from filter 252 is inverse-amplified by drive amplifier 254 and supplied to electrode pads 249B, 249D, 249F, and 249H. The driving signal output from the drive amplifier 254 is inverse-amplified by drive amplifier 255 and supplied to electrode pads 249A, 249C, 249E, and 249G. Drive circuit 250 thus supplies the driving signals having the phases shown in FIG. 18 to drive elements 229 to 236 to cause arms 221 to 224 to vibrate in the phases shown in FIG. 18.

Figure 20A:
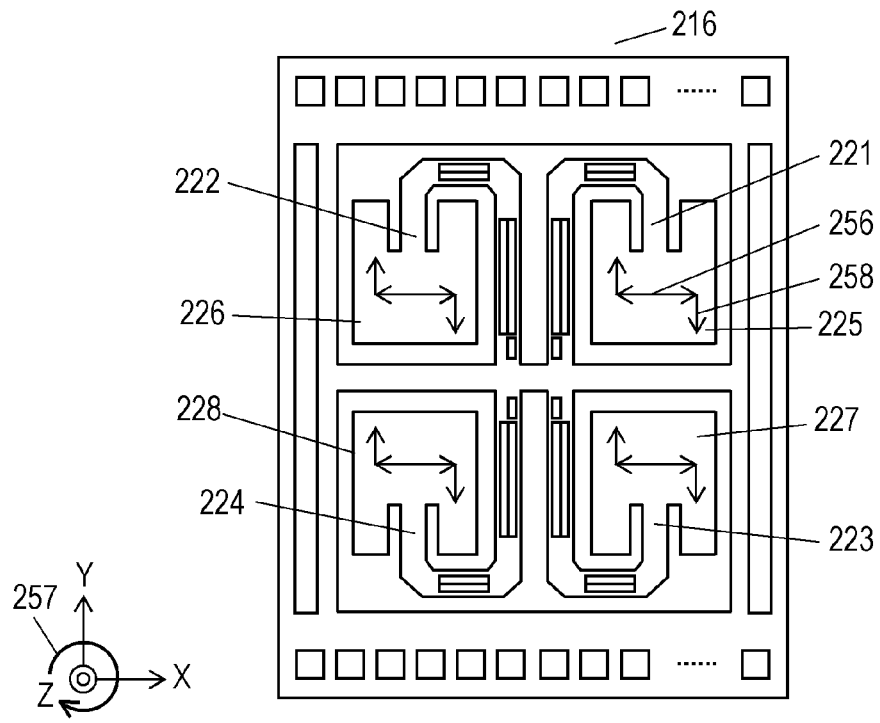
FIG. 20A is a schematic plan view of the angular velocity sensor according to Embodiment 5 for illustrating an operation of the sensor.
Figure 20B:
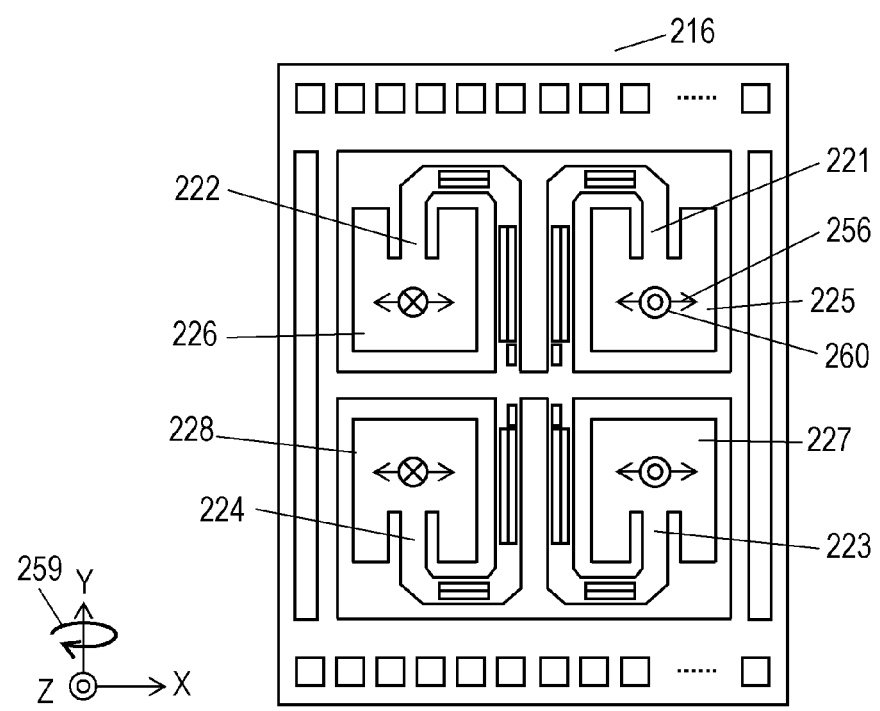
FIG. 20B is a schematic plan view of the angular velocity sensor according to Embodiment 5 for illustrating an operation of the sensor.

FIGS. 20A and 20B are schematic plan views of angular velocity sensor 216 for illustrating an operation for when an angular velocity is applied.

FIG. 20A is a plan view of angular velocity sensor 216 while detecting angular velocity 257 about the Z-axis. Driving signals supplied from drive circuit 250 to drive elements 229 to 236 produce drive vibrations 256 of a specific vibrating frequency on weights 225 to 228 in a direction of the X-axis. Angular velocity 257 about the Z-axis applied to angular velocity sensor 216 produces a Coriolis force in a direction of the Y-axis which produces detection vibrations 258 on weights 225 to 228. Detection vibrations 258 produced on weights 225 to 228 in the direction of the Y-axis cause arms 221 to 224 to vibrate in the direction of the X-axis. Arms 221 and 223 vibrate in the phase opposite to the phase of arms 222 and 224, and thus, the detection vibrations of arms 221 and 223 have phases opposite to phases of the detection vibrations of arms 222 and 224.

Detection signals output from detector elements 241 to 248 due to detection vibrations 258 have the same frequency as drive vibrations 256, and have amplitudes according to angular velocity 257. Amount ωz of angular velocity 257 can be detected by measuring the amplitudes of these detection signals.

FIG. 20B is a plan view of angular velocity sensor 216 while detecting angular velocity 259 about the Y-axis. In FIG. 20B, angular velocity 259 about the Y-axis produces a Coriolis force which produces detection vibrations 260 on weights 225 to 228 in a direction of the Z-axis. Arms 221 and 223 vibrate in the phase opposite to the phase of the vibration of arms 222 and 224, and thus, the phase of the detection vibrations of arms 221 and 223 are opposite to the phases of the detection vibrations of arms 222 and 224.

Detection signals output from detector elements 241 to 248 due to detection vibrations 260 have the same frequency as drive vibrations 256, and have amplitudes according to angular velocity 259. Amount ωy of angular velocity 259 can be detected by measuring the amplitudes of these detection signals.

Figures 21, 22:
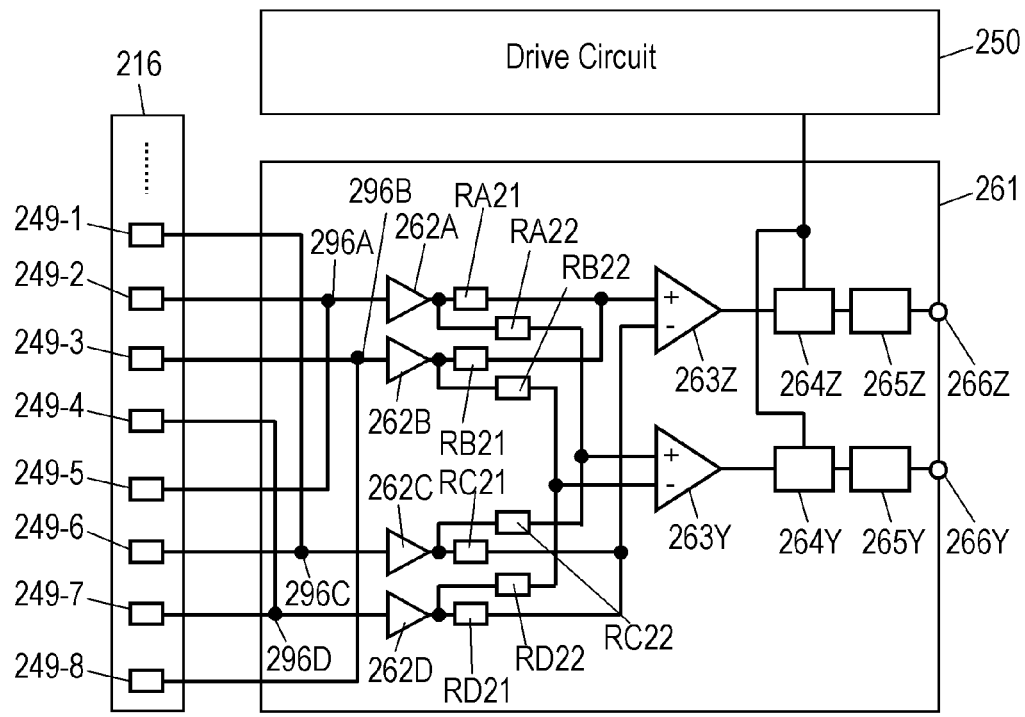
FIG. 21 shows phases of signals of the angular velocity sensor according to Embodiment 5.
FIG. 22 is a circuit diagram of a detector circuit connected to the angular velocity sensor according to Embodiment 5.

FIG. 21 shows signals S201 to S208 output from detector elements 241 to 248, respectively, and more specifically, phases of components attributed to the driving signals, phases of components attributed to angular velocities about the X-axis, the Y-axis, and the Z-axis, and phases of components attributed to accelerations in the directions of the X-axis, the Y-axis, and the Z-axis contained in the signals S201 to S208.

According to FIG. 21, the amount ωz of angular velocity 257 about the Z-axis is expressed as the following formula 6:

$$\omega z = \{(S202+S205)+(S203+S208)\} - \{(S201+S206)+(S204+S207)\} \quad \text{(Formula 6)}$$

The amount ωy of angular velocity 259 about the Y-axis is expressed as the following formula 7:

$$\omega y = \{(S202+S205)+(S201+S206)\} - \{(S203+S208)+(S204+S207)\} \quad \text{(Formula 7)}$$

In FIG. 21, the amplitudes of the components of signals S201 to S208 attributed to the driving signals, for instance, are equal to each other due to the symmetrical structure of each of units 291 to 293. In addition, amplitudes of the components signals S201 to S208 attributed to the angular velocity about the X-axis are equal to each other, and the same equality also applies to other angular velocities and accelerations. When phases of the components attributed to the drive vibrations are substituted for the symbols in formula 6 to obtain the amount ωz of angular velocity 257, the value of formula 6 becomes zero. In other words, if certain amounts of components attributed to the driving signals appear in detector elements 241 to 248 as undesired signals, these signals are cancelled with one another as a result of calculation in formula 6. Similarly, the value of formula 6 becomes zero when phases of the components attributed to the angular velocity about the X-axis are substituted into formula 6. The value of formula 6 becomes zero when phases of the components attributed to the angular velocity about the Y-axis are substituted into formula 6. The value of formula 6 becomes zero when phases of the components attributed to the acceleration in the direction of the X-axis are substituted into formula 6. The value of formula 6 becomes zero when phases of the components attributed to the acceleration in the direction of the Y-axis are substituted into formula 6. The value of formula 6 also becomes zero when phases of the components attributed to the acceleration in the direction of the Z-axis are substituted into formula 6. That is, undesired signals, such as angular velocities about the other axes and accelerations can be cancelled with one another as a result of calculation in formula 6

When the phases of the components attributed to the driving signals are substituted in the same manner for the symbols in formula 7 for obtaining an amount ωy of angular velocity 259 about the Y-axis, the value of formula 7 becomes zero. The value of formula 7 also becomes zero when phases of the components attributed to the angular velocity about the X-axis are substituted into formula 7. The value of formula 7 becomes zero when phases of the components attributed to the angular velocity about the Z-axis are substituted into the formula 7. The value of formula 7 becomes zero when phases of the components attributed to the acceleration in the direction of the X-axis are substituted into formula 7. The value of formula 7 becomes zero when phases of the components attributed to the acceleration in the direction of the Y-axis are substituted into formula 7. The value of formula 7 becomes zero when phases of the components attributed to the acceleration in the direction of the Z-axis are substituted into formula 7. That is, undesired signals, such as drive vibrations, angular velocities about the other axes, and accelerations, can be cancelled with one another as a result of calculation in formula 7.

Thus, detector unit 293 includes detector elements 241 to 248 disposed symmetrically with respect to both the axis AY21 parallel to the Y-axis and the axis AX21 parallel to the X-axis. This arrangement cancels the undesired signal components caused by drive vibrations, angular velocities about the other axes, and accelerations.

FIG. 22 is a circuit diagram of detector circuit 261 connected with angular velocity sensor 216. Electrode pads 249-1 to 249-8, some of electrode pads 249, are electrically connected with detector elements 241 to 248. Detector circuit 261 shown in FIG. 22 performs the calculation of formulae 6 and 7.

A signal line connected with electrode pad 249-2 and a signal line connected with electrode pad 249-5 are connected with each other at node 296A. Signal S202 which is a current output from electrode pad 249-2 and signal S205 which is a current output from electrode pad 249-5 are summed up at node 296A and input to IV converter 262A which converts the summed currents into a voltage and output the voltage. A signal line connected with electrode pad 249-3 and a signal line connected with electrode pad 249-8 are connected with each other at node 296B. Signal S203 which is a current output from electrode pad 249-3 and signal S208 which is a current output from electrode pad 249-8 are summed up at node 296B and input to IV converter 262B which converts the summed currents into a voltage and outputs the voltage. A signal line connected with electrode pad 249-1 and a signal line connected with electrode pad 249-6 are connected with each other at node 296C. Signal S201 which is a current output from electrode pad 249-1 and signal S206 which is a current output from electrode pad 249-6 are summed up at node 296C and input to IV converter 262C which converts the summed current to a voltage, and outputs the voltage. A signal line connected with electrode pad 249-4 and a signal line connected with electrode pad 249-7 are connected with each other at node 296D. Signal S204 which is a current output from electrode pad 249-4 and signal S207 which is a current output from electrode pad 249-7 are summed up at node 296D and input to IV converter 262D which converts the summed currents into a voltage, and outputs the voltage.

The amount ωz of angular velocity 257 about the Z-axis is calculated by the following structure. An output from IV converter 262A and an output from IV converter 262B are connected to a node via resistors RA21 and RB21, respectively. An output from IV converter 262C and an output from IV converter 262D are connected to a node through resistors RC21 and RD21, respectively. These nodes are connected to inputs of differential amplifier 263Z. According to Embodiment 5, resistors RA21 and RB21 have the same resistance, and resistors RC21 and RD21 have the same resistance. Detector circuit 264Z detects a signal output from differential amplifier 263Z with using a signal output from drive circuit 250. Low-pass filter 265Z filters the detected signal to extract a signal. The extract signal is output from output terminal 266Z as the amount ωz of angular velocity 257 about the Z-axis.

The amount ωy of angular velocity 259 about the Y-axis is calculated by the following structure. An output from IV converter 262A and an output from IV converter 262C are connected to a node via resistors RA22 and RC22, respectively. An output from IV converter 262B and an output from IV converter 262D are connected to a node via resistors RB22 and RD22, respectively. These nodes are connected to inputs of differential amplifier 263Y. According to Embodiment 5, resistors RA22 and RC22 have the same resistance, and resistors RB22 and RD22 have eth same resistance. Detector circuit 264Y detects a signal output from differential amplifier 263Y with using the signal output from drive circuit 250. Low-pass filter 265Y filters the detected signal to extract a signal. The extract signal is output from output terminal 266Y as the amount ωy of angular velocity 259 about the Y-axis.

As shown in FIGS. 21 and 22, the connections of electrode pads 249-1 to 249-8 cancel the components attributed to the driving signals before being input to IV converters 262A to 262D. The components attributed to the driving signals can be thus cancelled before the signals are amplified by IV converters 262A to 262D.

The components attributed to angular velocity 259 about the Y-axis are cancelled out in the connections of IV converters 262A to 262D before being input to differential amplifier 263Z for detecting angular velocity 257 about the Z-axis. The components attributed to angular velocity 259 about the Y-axis can be thus cancelled before the signal is amplified by IV converter 263Z.

Furthermore, the components attributed to angular velocity 257 about the Z-axis are cancelled out in the connections of IV converters 262A to 262D before being input to differential amplifier 263Y for detecting angular velocity 259 about the Y-axis.

As discussed above, detector unit 293 including detector elements 241 to 248 symmetrical with respect to both the axis AX21 parallel to the X-axis and the axis AY21 parallel to the Y-axis can cancel out the undesired signals, such as the components attributed to the driving signals, the components attributed to the angular velocities about the other axes, and the components attributed to the acceleration.

As shown in FIG. 16, detector elements 241 and 242 are symmetrical to each other with respect to the axis AY22 parallel to the Y-axis. Detector elements 243 and 244 are symmetrical to each other with respect to the axis AY23 parallel to the axis AY21. The axis AY23 is symmetrical to the axis AY22 with respect to the axis AY21. Detector elements 245 and 246 are symmetrical to each other with respect to the axis AY22. Detector elements 247 and 248 are symmetrical to each other with respect to the axis AY23.

All of arms 221 to 224 are driven to vibrate at the same mode of resonance in order to detect angular velocity 257 about the Z-axis according to the formula 6 and to detect angular velocity 259 about the Y-axis according to formula 7.

In conventional angular velocity sensor 101 shown in FIG. 34, arm 104 is driven to vibrate in the direction of X-axis by applying an AC voltage having a resonant frequency to drive element 112 provided on arm 104. This vibration causes other arms 105 to 107 to vibrate synchronously with the same resonance mode (e.g., resonance mode of 40 kHz). When an acceleration is applied, however, the vibration of arm 105 having a monitor electrode thereon shifts from its original resonance mode to a different resonance mode (e.g., resonance mode of 45 kHz) due to the warping of arm 105 in a direction of the applied acceleration, for instance. This may causes arms 104 to 107 to vibrate at a resonance mode different from the original resonance mode.

In angular velocity sensor 216 according to Embodiment 5, drive unit 291 including drive elements 229 to 236 disposed on arms 221 to 224 are symmetrical with respect to both axis AY21 parallel to the Y-axis and axis AX21 parallel to the X-axis. This arrangement allows arms 221 to 224 to vibrate stably at the same resonance mode by applying driving signals having the same amplitude and predetermined phases shown in FIG. 18 to drive elements 229 to 236 even under such an environmental condition that acceleration in any direction of the X-axis and the Y-axis is applied. Angular velocity sensor 216 can detect angular velocity 257 about the Z-axis and angular velocity 259 about the Y-axis accurately according to formula 6 and formula 7, respectively.

Figure 23:
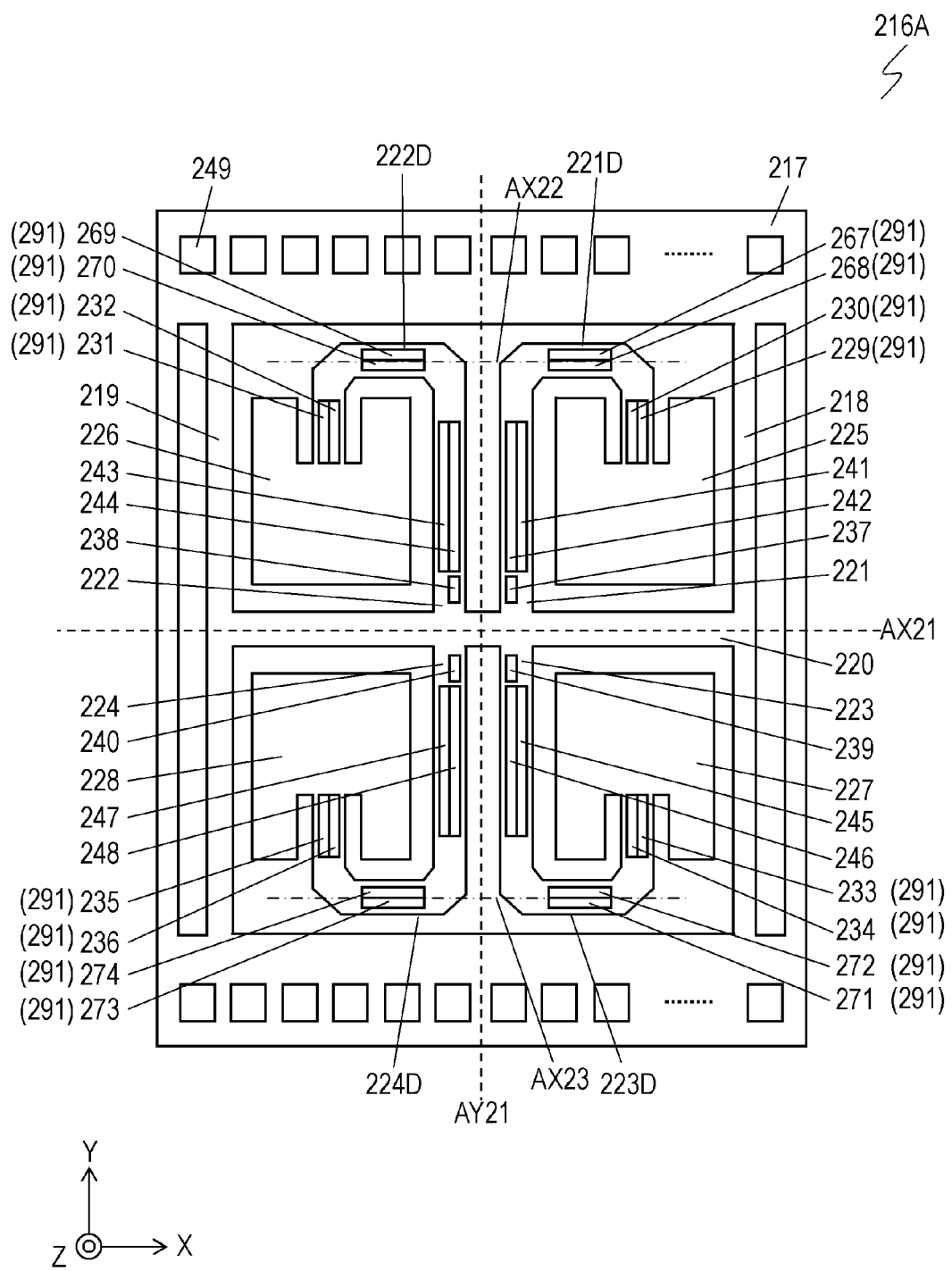
FIG. 23 is a plan view of another angular velocity sensor according to Embodiment 5.

FIG. 23 is a plan view of another angular velocity sensor 216A according to Embodiment 5. In FIG. 23, components identical to those of angular velocity sensor 216 shown in FIG. 16 are denoted by the same reference numerals.

Drive unit 291 of angular velocity sensor 216A shown in FIG. 23 further includes drive elements 267 and 274 disposed on elongated portions 221D to 224D of arms 221 to 224, respectively. This structure can drive arms 221 to 224 to vibrate stably also in the direction of Y-axis in the same resonance mode, thereby allowing angular velocity sensor 216A to additionally detect an angular velocity about the X-axis. In this case, the amount ωx of the angular velocity about the X-axis can be obtained by the following formula 8:

$$\omega x = (S201 + S202 + S203 + S204) - (S205 + S206 + S207 + S208) \quad \text{(Formula 8)}$$

Drive elements 267 and 268 are symmetrical to each other with respect to axis AX22 parallel to the axis AX21. Drive elements 269 and 270 are symmetrical to each other with respect to the axis AX22. Drive elements 271 and 272 are symmetrical to each other with respect to axis AX23 parallel to the axis AX21. The axis AX23 is symmetrical to the axis AX22 with respect to the axis AX21. Drive elements 273 and 274 are symmetrical to each other with respect to the axis AX23.

Drive elements 267 and 271 are symmetrical to each other with respect to the axis AX21. Drive elements 268 and 272 are symmetrical to each other with respect to the axis AX21. Drive elements 269 and 273 are symmetrical to each other with respect to the axis AX21. Drive elements 270 and 274 are symmetrical to each other with respect to the axis AX21.

Drive elements 267 and 269 are symmetrical to each other with respect to the axis AY21. Drive elements 268 and 270 are symmetrical to each other with respect to the axis AY21. Drive elements 271 and 273 are symmetrical to each other with respect to the axis AY21. Drive elements 272 and 274 are symmetrical to each other with respect to the axis AY21.

Drive elements 267 to 274 allows angular velocity sensor 216A to detect angular velocities in the three axes simultaneously while driving arms 221 to 224 steadily without being influenced adversely by external disturbances, such as accelerations.

In angular velocity sensors 216 and 216A according to Embodiment 5, arms 221 to 224 connected weights 225 to 228 are supported by lateral beam 220 which is supported by longitudinal beams 218 and 219 which are supported by support body 217. This structure can detect an angular velocity about any axis of the three axes simultaneously while having a disadvantage that the structure may accept an influenced, such as an acceleration or impacts. The canceling of the components attributable to angular velocities about the other axes and accelerations is effective particularly for this structure of angular velocity sensors 216 and 216A.

Exemplary Embodiment 6

Figure 24:
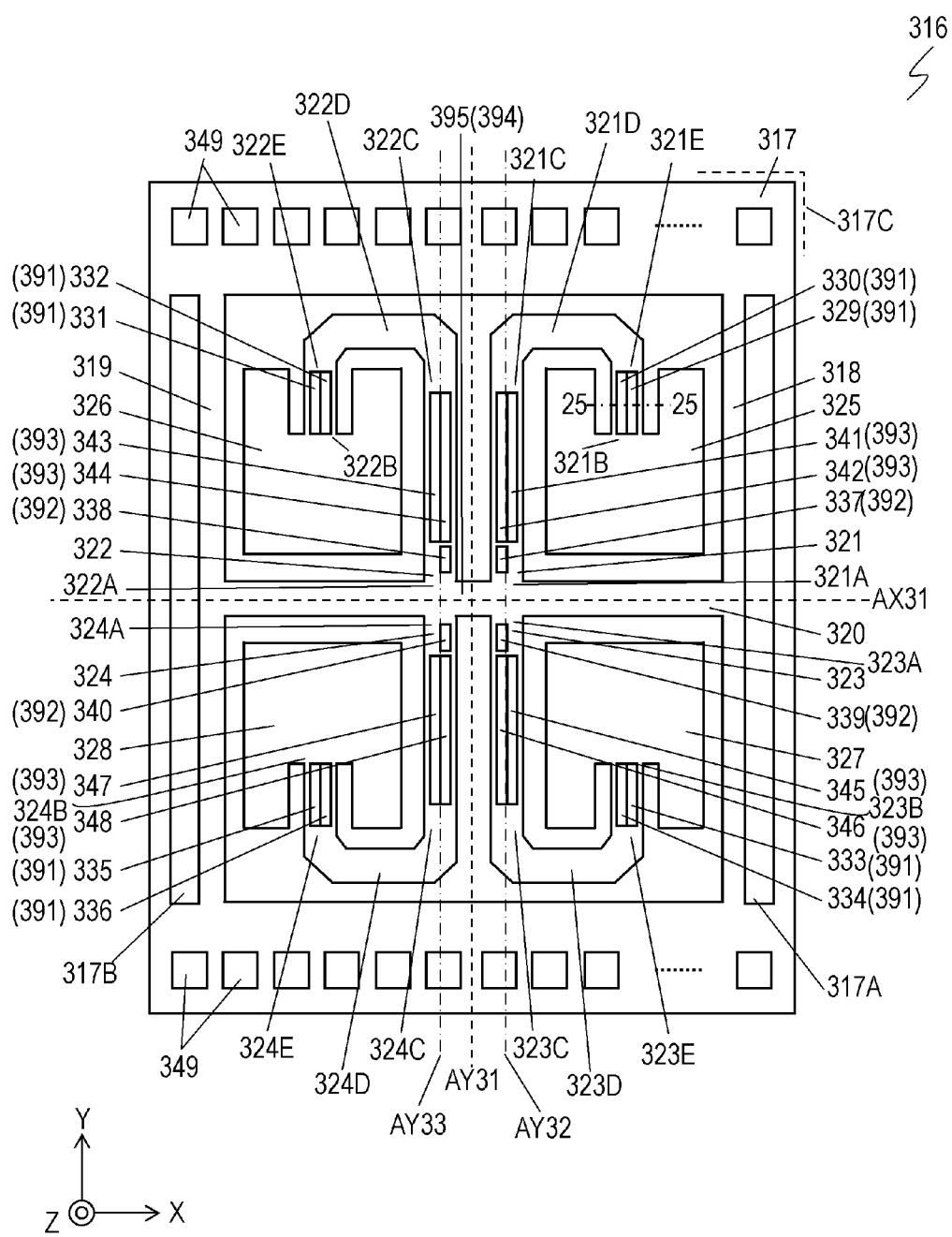
FIG. 24 is a plan view of an angular velocity sensor according to Exemplary Embodiment 6 of the invention.

FIG. 24 is a plan view of angular velocity sensor 316 according to Exemplary Embodiment 6.

In FIG. 24, an X-axis, a Y-axis, and a Z-axis that are perpendicular to each other are defined. An X-Y plane that contains the X-axis and the Y-axis is defined. Angular velocity sensor 316 includes support body 317 having a frame shape, longitudinal beams 318 and 319 supported by support body 317 and extending in parallel to the Y-axis, lateral beam 320 supported between longitudinal beams 318 and 319, weights 325 to 328, retaining portion 395 provided in middle portion 394 of lateral beam 320, arms 321 to 324 supported by retaining portion 395, drive unit 391 for driving arms 321 to 324 to vibrate the arms in parallel to the X-Y plane, monitor unit 392 for detecting displacements of arms 321 to 324 in a direction parallel to the X-Y plane, and detector unit 393 for detecting displacements of weights 325 to 328 in a direction of the X-axis, a direction of the Y-axis, or a direction of the Z-axis. Detector unit 393 detects displacements of arms 321 to 324 in directions of the X-axis, the Y-axis, and the Z-axis. Support body 317 is configured to be fixed to an object 317C to which an angular velocity is applied. Arm 321 has one end 321A supported by retaining portion 395 and another end 321B connected to weight 325, and extends in a positive direction of the Y-axis from one end 321A. Arm 322 has one end 322A supported by retaining portion 395 and another end 322B connected to weight 326, and extends in the positive direction of the Y-axis from one end 322A. Arm 323 has one end 323A supported by retaining portion 395 and another end 323B connected to weight 327, and extends in a negative direction of the Y-axis from one end 323A. Arm 324 has one end 324A supported by retaining portion 395 and another end 324B connected to weight 328, and extends in the negative direction of the Y-axis from one end 324A. Drive unit 391 includes drive elements 329 to 336 for causing arms 321 to 324 to vibrate in parallel to the X-Y plane. Monitor unit 392 includes monitor elements 337 to 340 for detecting displacements of arms 321 to 324 in a direction of X-axis, respectively. Detector unit 393 includes detector elements 341 to 348 for detecting displacements of weights 325 to 328 in a direction of the Y-axis or in a direction of the Z-axis. Retaining portion 395 is connected to support body 317 via lateral beam 320 and longitudinal beams 318 and 319. Support body 317 has slit 317A formed therein between support body 317 and longitudinal beam 318, and has slit 317B formed therein between support body 317 and longitudinal beam 319. Slits 317A and 317B provided between support body 317 and longitudinal beams 318 and 319 prevents a stress from transmitting to lateral beam 320 and arms 321 and 324 when angular velocity sensor 316 is bonded to a package, bottom cover, or the like.

Support body 317 does not necessarily have slit 317A or 317B formed therein. In this case, a part of support body 317 functions as longitudinal beams 318 and 319. This configuration reduces the width of angular velocity sensor 316 in a direction of the X-axis.

Support body 317 is a fixed member that supports longitudinal beams 318 and 319, and is fixed to a package having angular velocity sensor 316 accommodated therein with using another support member, such as adhesive. Plural electrode pads 349 are disposed on an outer periphery of support body 317. Electrode pads 349 are individually wired and connected electrically with drive elements 329 to 336, monitor elements 337 to 340 and detector elements 341 to 348.

Longitudinal beams 318 and 319 extend in parallel to the Y-axis with both ends thereof connected to support body 317 to be suspended by support body 317. Longitudinal beams 318 and 319 can warp in directions of Z-axis. In addition, longitudinal beams 318 and 319 are substantially symmetrical to each other with respect to axis AY31 parallel to the Y-axis. This structure enables both longitudinal beams 318 and 319 to warp with substantially equal amplitudes in responsive to an angular velocity applied to angular velocity sensor 316.

Lateral beam 320 extends in parallel to the X-axis with one end thereof connected to a substantially middle position of longitudinal beam 318, and another end connected to a substantially middle position of longitudinal beam 319 such that lateral beam 320 can warp in directions of Z-axis.

Arm 321 has substantially a J-shape that includes elongated portion 321C extending in the positive direction of the Y-axis from one end 321A connected to retaining portion 395, elongated portion 321D extending in the positive direction of the X-axis from elongated portion 321C, and elongated portion 321E extending in the negative direction of the Y-axis from elongated portion 321D. Another end 321B is an end of elongated portion 321E, and is connected with weight 325.

Arm 322 also has substantially a J-shape that includes elongated portion 322C extending in the positive direction of the Y-axis from one end 322A connected to retaining portion 395, elongated portion 322D extending in the negative direction of the X-axis from elongated portion 322C, and elongated portion 322E extending in the negative direction of the Y-axis from elongated portion 322D. Another end 322B is an end of elongated portion 322E, and is connected with weight 326.

Arm 323 has substantially a J-shape that includes elongated portion 323C extending in the negative direction of the Y-axis from one end 323A connected to retaining portion 395, elongated portion 323D extending in the positive direction of the X-axis from elongated portion 323C, and elongated portion 323E extending in the positive direction of the Y-axis from elongated portion 323D. Another end 323B is an end of elongated portion 323E, and is connected with weight 327.

Arm 324 has substantially a J-shape that includes elongated portion 324C extending in the negative direction of the Y-axis from one end 324A connected to retaining portion 395, elongated portion 324D extending in the negative direction of the X-axis from elongated portion 324C, and elongated portion 324E extending in the positive direction of the Y-axis from elongated portion 324D. Another end 324B is an end of elongated portion 324E, and is connected with weight 328.

Arms 321 to 324 can warp in directions of the X-axis, the Y-axis, and the Z-axis.

Arms 321 and 322 are symmetrical to each other with respect to axis AY31 parallel to the Y-axis. Arms 323 and 324 are symmetrical to each other with respect to the axis AY31. Similarly, arms 321 and 323 are symmetrical to each other with respect to axis AX31 parallel to the X-axis. Arms 322 and 324 are symmetrical to each other with respect to the AX31. This structure enables all arms 321 to 324 to warp with substantially equal amplitudes responsive to an angular velocity applied to angular velocity sensor 316.

Support body 317, longitudinal beams 318 and 319, lateral beam 320, and arms 321 to 324 may be made of piezoelectric material, such as crystal, $LiTaO_3$, or $LiNbO_3$, or of a non-piezoelectric material, such as silicon, diamond, fused quartz, alumina, or GaAs. When being made of silicon, angular velocity sensor 316 may have a very small size by a micro-machining technique, and can be integrated with integrated circuit (IC) that composes circuits.

Support body 317, longitudinal beams 318 and 319, lateral beam 320, and arms 321 to 324 may be formed individually with different materials or the same material, and then, they can be assembled together. Alternatively, they may be formed integrally with a single material. Support body 317, longitudinal beams 318 and 319, lateral beam 320, and arms 321 to 324 can be manufactured efficiently when a single and same material is used because they can be formed by a single process of dry etching or wet etching.

Drive elements 329 to 336 drive and displace arms 321 to 324 in a direction of X-axis. Drive elements 329 to 336 according to Embodiment 6 utilize a piezoelectric method with piezoelectric elements, such as PZT, however, may utilize an electrostatic method with capacitances between electrodes.

FIG. 25 is a schematic cross-sectional view of drive elements 329 and 330 along line 25-25 shown in FIG. 24. Drive element 329 includes piezoelectric element 329B sandwiched between lower electrode 329A and upper electrode. Drive element 330 includes piezoelectric element 330B sandwiched between lower electrode 330A and upper electrode 330C. Drive elements 329 and 330 are provided on an upper surface of arm 321. In other words, drive elements 329 and 330 includes lower electrodes 329A and 330A provided on the upper surface of arm 321, piezoelectric elements 329B and 330B provided on lower electrodes 329A and 330A, and upper electrodes 329C and 330C provided on piezoelectric elements 329B and 330B, respectively. Lower electrodes 329A and 330A and Upper electrodes 329C and 330C may be made of platinum (Pt), gold (Au), aluminum (Al), alloy containing mainly these metals, or oxide of these metals. Lower electrodes 329A and 330A may preferably be made of platinum (Pt) is used for bottom electrodes 329A and 330A that can promote an orientation of the PZT, i.e., the material of piezoelectric elements 329B and 330B into a single direction. Upper electrodes 329A and 330C may preferably be made of gold (Au). Gold exhibits very low deterioration in resistance over time, thus providing angular velocity sensor 316 with high reliability. According to this embodiment, both lower electrodes 329A and 330A are at a reference potential, so that arm 321 can vibrate in directions of the X-axis by applying an alternating-current (AC) driving voltage to upper electrodes 329C and 330C. Alternatively, an AC driving voltage may be applied to lower electrodes 329A and 330A and upper electrodes 329C and 330C. This operation enables arm 321 to vibrate more efficiently. Drive elements 331 to 336 have a structure similar to that of drive elements 329 and 330, and are provided on upper surfaces of arms 322 to 324, respectively. Drive elements 329 to 336 are formed on arms 321 to 324 at sides close to weights 325 to 328, i.e., on elongated portions 321E to 324E, as shown in FIG. 24. This structure ensures sufficient areas of portions of arms 321 to 324 at sides close to lateral beam 320 to dispose detector elements 341 to 348 thereon. If, on the other hand, drive elements 329 to 336 are disposed to the other sides of arms 321 to 324 close to lateral beam 320, i.e., on elongated portions 321C to 324C, drive elements 329 to 336 can drive arms 321 to 324 to vibrate more efficiently. This arrangement can provide drive elements 329 to 336 with a large size, and accordingly increases amplitude of vibration of arms 321 to 324, thereby increasing sensitivity of angular velocity sensor 316.

FIG. 26 shows phases of driving signals applied to drive elements 329 to 336 and phases of vibration of arms 321 to 324. Driving signals having the same phase (+) are applied to drive elements 329, 331, 333, and 335, while driving signals having opposite phase (−) to drive elements 329, 331, 333, and 335 are applied to drive elements 330, 332, 334, and 336. This causes arms 321 and 323 to vibrate in the direction of the X-axis with the same phase (+) while arms 322 and 324 to vibrate in the direction of the X-axis in the opposite phase (−) to the phase of the vibration of arms 321 and 323.

Detector elements 341 to 348 detect displacements of arms 321 to 324 in the direction of the Y-axis or the direction of the Z-axis. Detector elements 341 to 348 utilize a piezoelectric method using piezoelectric elements. However, the detector elements may utilize an electrostatic method with capacitances between the electrodes.

Each of detector elements 341 to 348 includes a piezoelectric element sandwiched between a lower electrode and an upper electrode, and provided on the upper surfaces of arms 321 to 324 similarly to drive elements 329 and 330 shown in FIG. 25. Detector elements 341 to 348 are provided on arms 321 to 324 at sides close to lateral beam 320, i.e., on elongated portions 321C to 324C, respectively. This structure enables detector elements 341 to 348 to efficiently detect the displacements. Since detector elements 341 to 348 in this case have large sizes, they can increase the sensitivity of angular velocity sensor 316. On the other hand, when detector elements 341 to 348 are disposed at the other sides of arms 321 to 324 close to weights 325 to 328, i.e., on respective elongated portions 321E to 324E, respectively, this arrangement ensures spaces to dispose drive elements 329 to 336 on arms 321 to 324 at the sides close to lateral beam 320.

Monitor elements 337 to 340 detect displacements of arms 321 to 324 in the direction of X-axis. Monitor elements 337 to 340 according to Embodiment 6 utilizes a piezoelectric method with piezoelectric elements. However, the monitor elements may utilize an electrostatic method with capacitances between the electrodes.

Each of monitor elements 337 to 340 includes piezoelectric elements sandwiched between a lower electrode and an upper electrode, and are provided on the upper surfaces of arms 321 to 324, similarly to drive elements 329 and 330 shown in FIG. 25. Monitor elements 337 to 340 are disposed at positions to produce monitor signals having the same phases as the vibrations of arms 321 to 324 shown in FIG. 26. Specifically, monitor elements 337 to 340 are provided on arms 321 to 324 at sides close to lateral beam 320, i.e., on elongated portions 321C to 324C as shown in FIG. 24. This structure enables monitor elements 337 to 340 to detect efficiently deformations of arms 321 to 324 according to the displacements while having a small size. The sizes of monitor elements 337 to 340 are preferably smaller than those of detector elements 341 to 348 to ensure spaces for disposing detector elements 341 to 348 thereon.

As shown in FIG. 24, monitor elements 337 and 338 are symmetrical to each other with respect to axis AY31 parallel to the Y-axis. Monitor elements 339 and 340 are symmetrical to each other with respect to the axis AY31. Monitor elements 337 and 339 are symmetrical to each other with respect to axis AX31 parallel to the X-axis. Monitor elements 338 and 340 are symmetrical to each other with respect to the axis AX31. Monitor unit 392 including monitor elements 337 to 340 is disposed symmetrically with respect to both the axis AY31 and the axis AX31. This arrangement cancels undesired signals attributable to external disturbances, such as acceleration or impact, thus allowing angular velocity sensor 316 to detect angular velocities accurately.

FIG. 27 is a circuit diagram of drive circuit 350 connected with angular velocity sensor 316. Electrode pads 349A to 349H, some of electrode pads 349, are electrically connected with drive elements 329 to 336. Electrode pads 349I to 349L, some of electrode pads 349, are electrically connected with monitor elements 337 to 340. Signal lines connected to electrode pads 349I to 349L are connected together at node 396. Monitor signals which are currents output from electrode pads 349I to 349L are summed up at node 396, and input to IV converter 351 which converts the currents into a voltage. Automatic gain controller (AGC) 352 adjusts this voltage to have constant amplitude and outputs the voltage. Filter 353 removes unnecessary frequency components from the voltage output from AGC 352. A voltage output from filter 353 is inverse-amplified by drive amplifier 354 and supplied to electrode pads 349B, 349D, 349F and 349H. In addition, the driving signal output from drive amplifier 354 is inverse-amplified by drive amplifier 355 and supplied to electrode pads 349A, 349C, 349E and 349G. Drive circuit 350 of this structure can supply the driving signals having the phases shown in FIG. 26 to drive elements 329 to 336, and causes arms 321 to 324 to vibrate in the phases shown in FIG. 26.

Figure 28A:
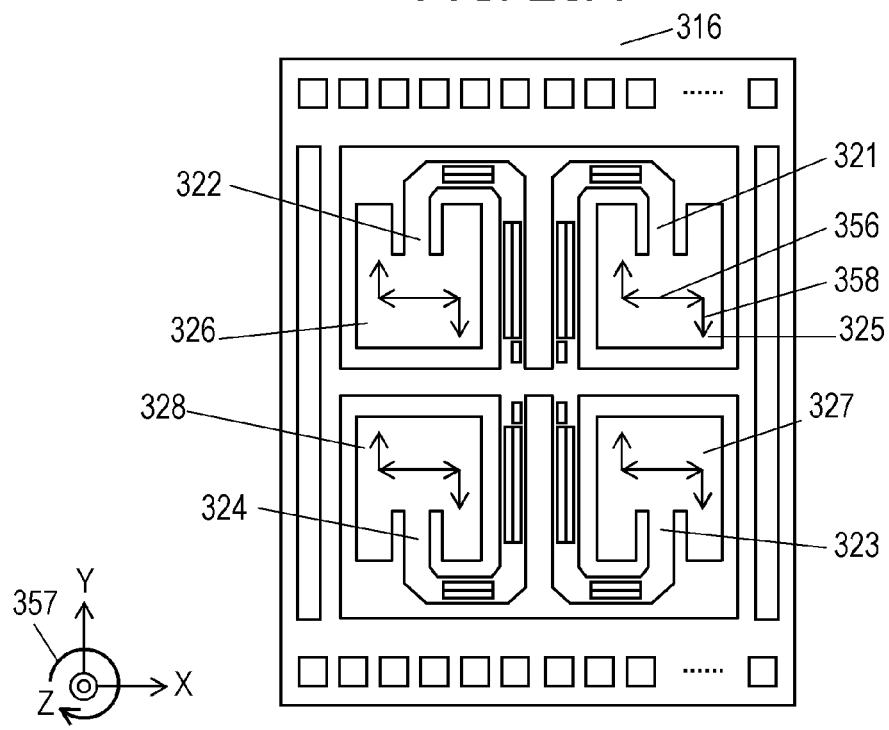
FIG. 28A is a schematic plan view of the angular velocity sensor according to Embodiment 6 for illustrating an operation of the sensor.
Figure 28B:
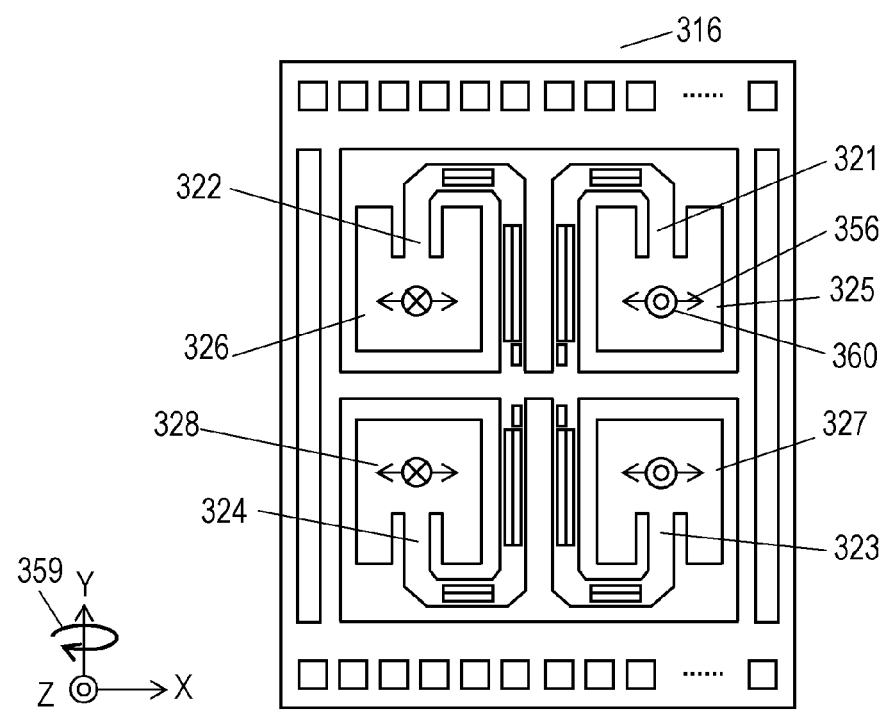
FIG. 28B is a schematic plan view of the angular velocity sensor according to Embodiment 6 for illustrating an operation of the sensor.

FIGS. 28A and 28B are schematic plan views of angular velocity sensor 316 for illustrating an operation in responsive to an angular velocity applied thereto.

FIG. 28A is a plan view of angular velocity sensor 316 upon detecting angular velocity 357 about the Z-axis. Driving signals supplied from drive circuit 350 to drive elements 329 to 336 produce drive vibrations 356 of a specific vibrating frequency on weights 325 to 328 in a direction of the X-axis. Angular velocity 357 about the Z-axis applied to angular velocity sensor 316 produces a Coriolis force in a direction of the Y-axis which produces detection vibrations 358 on weights 325 to 328. Detection vibrations 358 produced on weights 325 to 328 in the direction of the Y-axis cause arms 321 to 324 to vibrate in the direction of the X-axis. Arms 321 and 323 vibrate in the phase opposite to the phase of vibration of arms 322 and 324, and thus, the detection vibrations of arms 321 and 323 have phases opposite to phases of the detection vibrations of arms 322 and 324.

Detection signals output from detector elements 341 to 348 due to detection vibrations 358 have the same frequency as drive vibrations 356, and have amplitudes according to angular velocity 357. Amount ωz of angular velocity 357 can be detected by measuring the amplitudes of these detection signals.

FIG. 28B is a plan view of angular velocity sensor 316 while detecting angular velocity 359 about the Y-axis. Angular velocity 359 about the Y-axis produces a Coriolis force which produces detection vibrations 360 on weights 325 to 328 in a direction of the Z-axis. Arms 321 and 323 vibrate in the phase opposite to the phase of the vibration of arms 322 and 324, and thus, the phase of the detection vibrations of arms 321 and 323 are opposite to the phases of the detection vibrations of arms 322 and 324.

Detection signals output from detector elements 341 to 348 due to detection vibrations 360 have the same frequency as drive vibrations 356, and have amplitudes according to angular velocity 359. Amount ωy of angular velocity 359 can be detected by measuring the amplitudes of these detection signals.

Figures 29, 30:
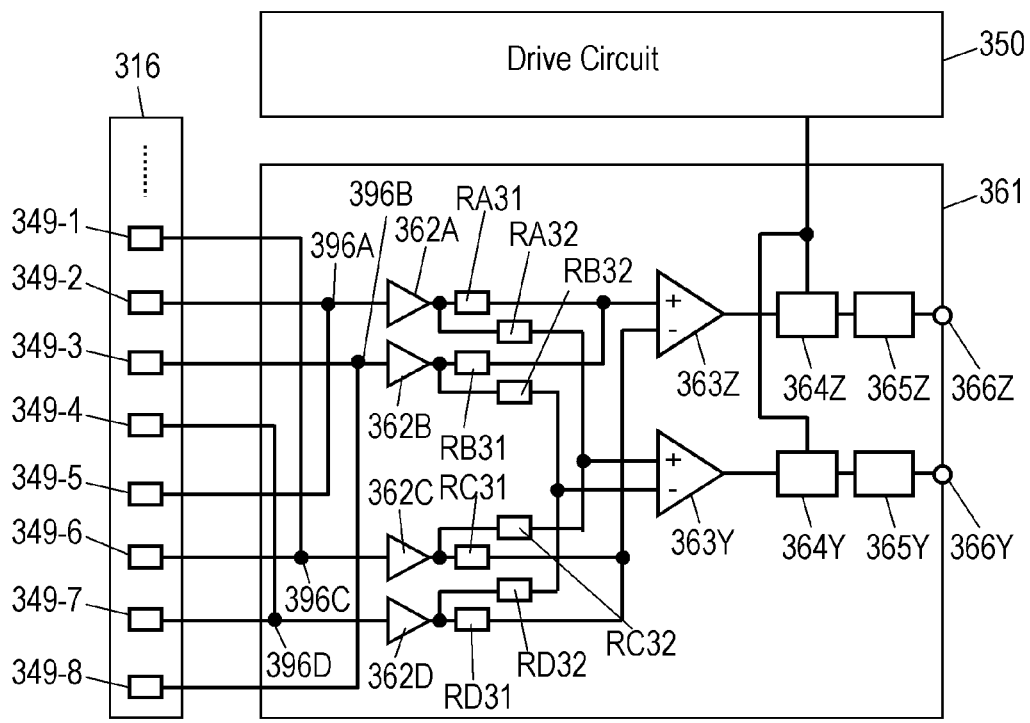
FIG. 29 shows phases of signals of the angular velocity sensor according to Embodiment 6.
FIG. 30 is a circuit diagram of a detector circuit connected to the angular velocity sensor according to Embodiment 6.

FIG. 29 shows signals S301 to S308 output from detector elements 341 to 348, respectively, and more specifically, phases of components in the signals S301 to S308 attributed to the driving signals, and phases of components attributed to angular velocities about the X-axis, the Y-axis, and the Z-axis.

According to FIG. 29, the amount ωz of angular velocity 357 about the Z-axis is expressed as the following formula 9:

$$\omega z = \{(S302+S305)+(S303+S308)\} - \{(S301+S306)+(S304+S307)\} \quad \text{(Formula 9)}$$

The amount ωy of angular velocity 359 about the Y-axis is expressed as the following formula 10:

$$\omega y = \{(S302+S305)+(S301+S306)\} - \{(S303+S308)+(S304+S307)\} \quad \text{(Formula 10)}$$

In FIG. 29, the amounts of the components attributed to the driving signals, for instance, are the same in all signals S301 to S308 due to the symmetrical structure of units 391 to 393. In addition, the amounts of the components attributed to the angular velocity about the X-axis are the same in the signals S301 to S308, and the same equality is also applied to other angular velocities. When phases of the components attributed to the driving signals are substituted for the symbols in formula 9 to obtain amount ωz of angular velocity 357, the value of formula 9 becomes zero. In other words, if certain amounts of components attributed to the driving signals appear in detector elements 341 to 348 as undesired signals, these signals are cancelled with one another as a result of calculation in formula 9. Similarly, the value of formula 9 becomes zero when phases of the components attributed to the angular velocity about the X-axis are substituted in formula 9. The value of formula 9 becomes zero when phases of the components attributed to the angular velocity about the Y-axis are substituted in formula 9. That is, undesired signals can be cancelled out with one another as a result of the calculation in formula 9 even when the undesired signals, such as the driving signals, the angular velocity about the X-axis, and the angular velocity about the Y-axis, appear.

Similarly, the value of formula 10 becomes zero when the phases of the components attributed to the driving signals, phases of the components attributed to the angular velocity about the X-axis, and phases of the components attributed to the angular velocity about the Z-axis are substituted in the same manner for the symbols in formula 10 to obtain amount ωy of angular velocity 359 about the Y-axis. In other words, the undesired signals can be cancelled with one another as a result of the calculation in formula 10 even when the undesired signals appear due to the driving signals and angular velocities about the X-axis and the Z-axis.

As discussed, detector unit 393 comprising detector elements 341 to 348 allows angular velocity sensor 316 to detect the angular velocities about the Z-axis as well as the Y-axis accurately.

FIG. 30 is a circuit diagram of detector circuit 361 connected with angular velocity sensor 316. Electrode pads 349-1 to 349-8, some of electrode pads 349, are electrically connected with detector elements 341 to 348. Detector circuit 361 shown in FIG. 30 performs the calculation according to formulae 9 and 10.

A signal line connected with electrode pad 349-2 and a signal line connected with electrode pad 349-5 are connected together at node 396A. Signal S302 which is a current output from electrode pad 349-2 and signal S305 which is a current output from electrode pad 349-5 are summed up at node 396A and input to IV converter 362A which converts the summed currents into a voltage and outputs the voltage. A signal line connected with electrode pad 349-3 and a signal line connected with electrode pad 349-8 are connected together at node 396B. Signal S303 which is a current output from electrode pad 349-3 and signal S308 which is a current output from electrode pad 349-8 are summed up at node 396B and input to IV converter 362B which converts the summed currents into a voltage and outputs the voltage. A signal line connected with electrode pad 349-1 and a signal line connected with electrode pad 349-6 are connected together at node 396C. Signal S301 which is a current output from electrode pad 349-1 and signal S306 which is a current output from electrode pad 349-6 are summed up at node 396C and input to IV converter 362C which converts the summed currents into a voltage and outputs the voltage. A signal line connected with electrode pad 349-4 and a signal line connected with electrode pad 349-7 are connected together at node 396D. Signal S304 which is a current output from electrode pad 349-4 and signal S307 which is a current output from electrode pad 349-7 are summed up at node 396D and input to IV converter 362D which converts the summed current into a voltage and outputs the voltage.

The amount ωz of angular velocity 357 about the Z-axis is calculated by the following structure. An output from IV converter 362A and an output from IV converter 362B are connected to a node via resistors RA31 and RB31, respectively. An output from IV converter 362C and an output from IV converter 362D are connected to a node through resistors RC31 and RD31, respectively. These nodes are connected to inputs of differential amplifier 363Z. According to Embodiment 6, resistors RA31 and RB31 have the same resistance, and resistors RC31 and RD31 have the same resistance. Detector circuit 364Z detects a signal output from differential amplifier 363Z with using a signal output from drive circuit 350. Low-pass filter 365Z filters the detected signal to extract a signal. The extract signal is output from output terminal 366Z as the amount ωz of angular velocity 357 about the Z-axis.

The amount ωy of angular velocity 359 about the Y-axis is calculated by the following structure. An output from IV converter 362A and an output from IV converter 362C are connected to a node via resistors RA32 and RC32, respectively. An output from IV converter 362B and an output from IV converter 362D are connected to a node via resistors RB32 and RD32, respectively. These nodes are connected to inputs of differential amplifier 363Y. According to Embodiment 6, resistors RA32 and RC32 have the same resistance, and resistors RB32 and RD32 have eth same resistance. Detector circuit 364Y detects a signal output from differential amplifier 363Y with using the signal output from drive circuit 350. Low-pass filter 365Y filters the detected signal to extract a signal. The extract signal is output from output terminal 366Y as the amount ωy of angular velocity 359 about the Y-axis.

As shown in FIGS. 29 and 30, the connections of electrode pads 349-1 to 349-8 cancel out the components attributed to the driving signals before being input to IV converters 362A to 362D. The components attributed to the driving signals can be thus cancelled before the signals are amplified by IV converters 362A to 362D.

Similarly, the components attributed to angular velocity 359 about the Y-axis are cancelled in the connections of IV converters 362A to 362D before being input to differential amplifier 363Z for detecting the amount ωz of angular velocity 357 about the Z-axis. The components attributed to angular velocity 359 about the Y-axis can be thus cancelled before the signal is amplified by IV converter 363Z.

Furthermore, the components attributed to angular velocity 359 about the Z-axis are cancelled out in the connections of IV converters 362A to 362D before being input to differential amplifier 363Y for detecting the amount ωy of angular velocity 359 about the Y-axis.

FIG. 31 shows phases of the signals of angular velocity sensor 316, and more specifically, phases of the components attributed to the driving signals supplied from drive circuit 350 and contained in signals M301 to M304 output from monitor elements 337 to 340, phases of monitor signals M301 to M304, and phases of the components attributed to accelerations in the directions of X-axis and Y-axis.

In FIG. 31, amplitudes of the components attributed to the vibrations being monitored, for instance, are equal in all signals M301 to M304, the components attributed to other accelerations are equal as well. Signals M301 to M304 which are currents output from electrode pads 349I to 349L shown in FIG. 27, or the outputs of monitor elements 337 to 340 are summed up at node 396, so that the total of monitor signals M301 to M304 becomes to 4+, as shown in FIG. 31. On the other hand, when acceleration is applied in the direction of X-axis, that is the acceleration from the positive direction toward the negative direction in the X-axis, all of arms 321 to 324 deflect in the negative direction of the X-axis, thus causing the phases of signals M301 to M304 become "−", "+", "−", and "+", as shown in FIG. 31. These undesired signals which are the components attributed to the acceleration in the direction of X-axis are therefore cancelled out by connecting signal lines of the outputs from monitor elements 337 to 340.

Similarly, undesired signals produced when acceleration is applied in the direction of Y-axis, or from the positive direction toward the negative direction in the Y-axis are cancelled out at the connection of the signal lines output from monitor elements 337 to 340.

As discussed above, monitor unit 392 includes monitor elements 337 to 340 disposed symmetrically with respect to both the axis AY31 parallel to the Y-axis and the axis AX31 parallel to the X-axis, and can cancel the undesired signal components of the accelerations, thus allowing the sensor to detect the angular velocity accurately.

Figure 32:
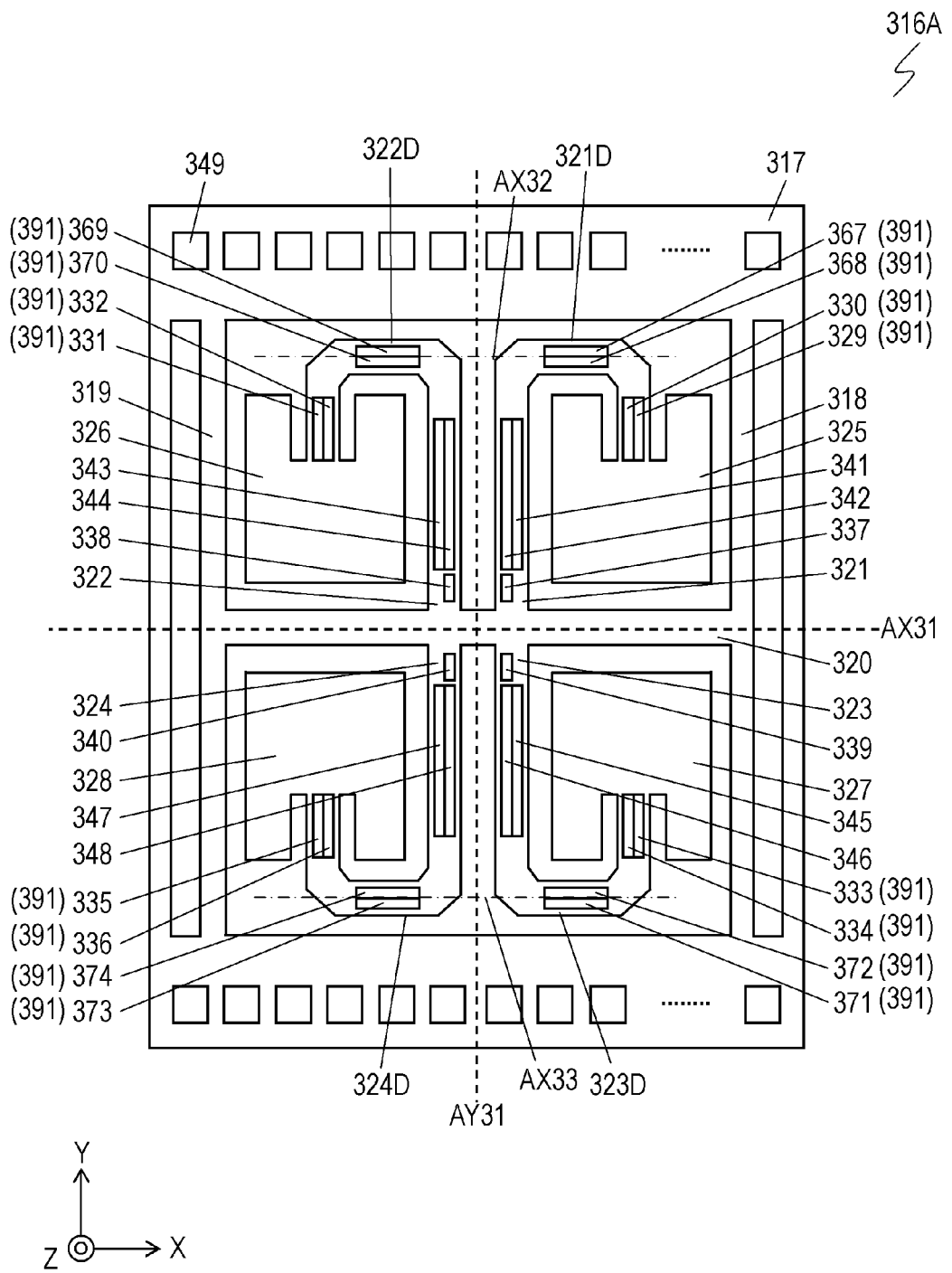
FIG. 32 is a plan view of another angular velocity sensor according to Embodiment 6.

FIG. 32 is a plan view of another angular velocity sensor 316A according to Embodiment 6. In FIG. 32, components identical to those of angular velocity sensor 316 shown in FIG. 24 are denoted by the same reference numerals. Drive unit 391 of angular velocity sensor 316A shown in FIG. 32 further includes drive elements 367 and 368 disposed on elongated portion 321D of arm 321, drive elements 369 and 370 disposed on elongated portion 322D of arm 322, drive elements 371 and 372 disposed on elongated portion 323D of arm 323, and drive elements 373 and 374 disposed on elongated portion 324D of arm 324. This structure can drive arms 321 to 324 to vibrate in an additional direction of the Y-axis, thereby allowing sensor 316A to further detect an angular velocity about the X-axis. In this case, an amount ωx of an angular velocity about the X-axis is expressed as the following formula 11:

$$\omega x = (S301 + S302 + S303 + S304) - (S305 + S306 + S307 + S308) \quad \text{(Formula 11)}$$

Drive elements 367 and 368 are symmetrical to each other with respect to axis AX32 parallel to the axis AX31. Drive elements 369 and 370 are symmetrical to each other with respect to the axis AX32. Drive elements 371 and 372 are symmetrical to each other with respect to axis AX33 parallel to the axis AX31. The axis AX33 is symmetrical to the axis AX32 with respect to the axis AX31. Drive elements 373 and 374 are symmetrical to each other with respect to the axis AX33.

Moreover, drive elements 367 and 371 are symmetrical to each other with respect to the axis AX31. Drive elements 368 and 372 are symmetrical to each other with respect to the axis AX31. Drive elements 369 and 373 are symmetrical to each other with respect to the axis AX31. Drive elements 370 and 374 are symmetrical to each other with respect to the axis AX31.

Furthermore, drive elements 367 and 369 are symmetrical to each other with respect to the axis AY31. Drive elements 368 and 370 are symmetrical to each other with respect to the axis AY31. Drive elements 371 and 373 are symmetrical to each other with respect to the axis AY31. Drive elements 372 and 374 are also symmetrical to each other with respect to the axis AY31.

Drive elements 367 to 374 allows sensor 316A to detect angular velocities in all the three axes simultaneously while improving the accuracy of detecting the angular velocities by cancelling out the undesired signal components attributable to the accelerations.

In angular velocity sensor 316A according to Embodiment 6, monitor elements 337 to 340 are disposed closer to the inner circumferential sides of arms 321 to 324 having the J-shape, however, may be located closer to the outer circumferential sides of the J-shape of the arms.

Figure 33:
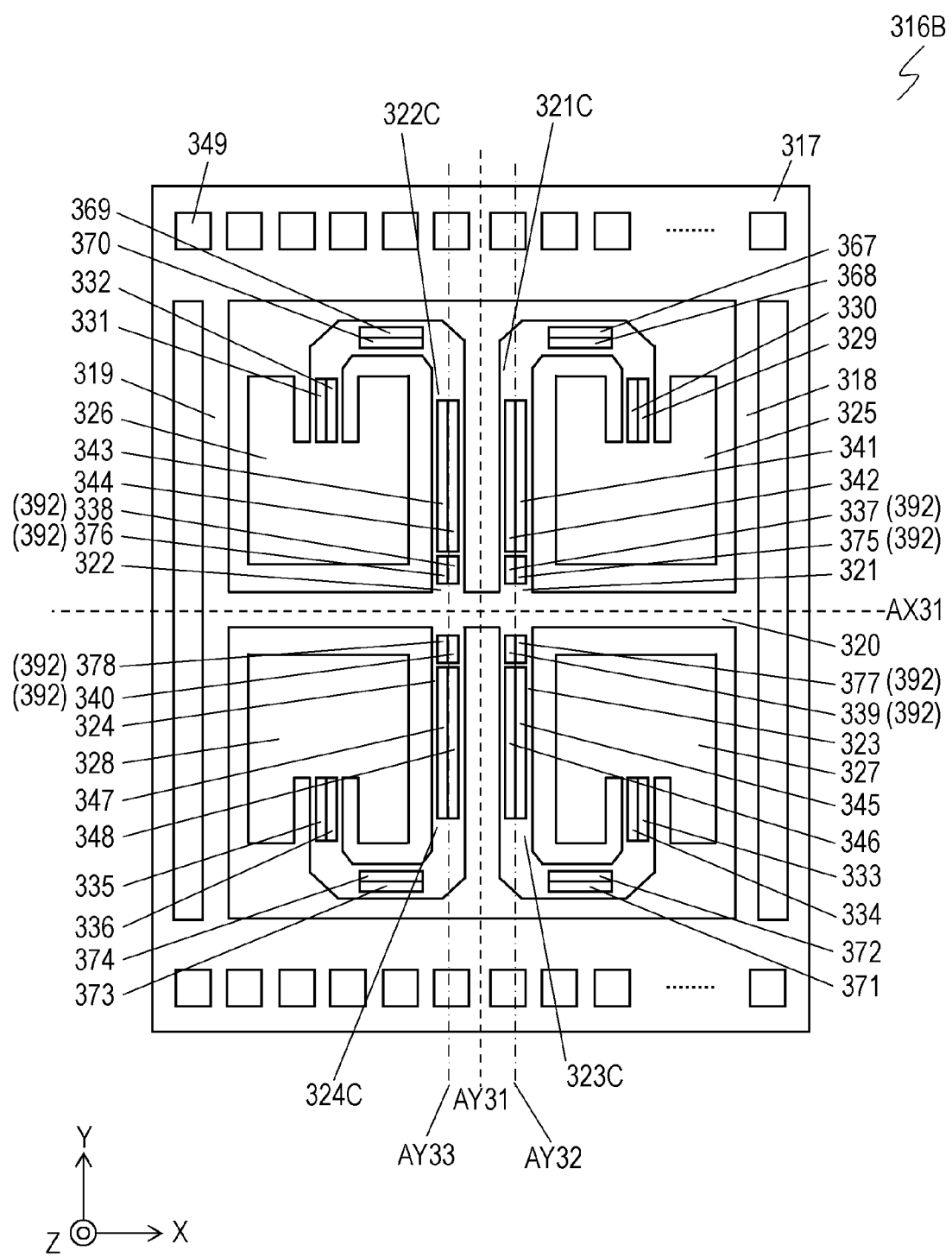
FIG. 33 is a plan view of still another angular velocity sensor according to Embodiment 6.

FIG. 33 is a plan view of still another angular velocity sensor 316B according to Embodiment 6. In FIG. 33, components identical to those of angular velocity sensor 316A shown in FIG. 32 are denoted by the same reference numerals. Monitor unit 392 of angular velocity sensor 316B shown in FIG. 33 further includes monitor elements 375 to 378 disposed on elongated portions 321C to 324C of arms 321 to 324, respectively. Monitor elements 337 and 338 are symmetrical to each other with respect to axis AY31. Monitor elements 375 and 376 are symmetrical to each other with respect to the axis AY31. Monitor elements 339 and 340 are symmetrical to each other with respect to the axis AY31. Monitor elements 377 and 378 are also symmetrical to each other with respect to the axis AY31. Monitor elements 337 and 339 are symmetrical to each other with respect to axis AX31. Monitor elements 375 and 377 are symmetrical to each other with respect to the axis AX31. Monitor elements 338 and 340 are symmetrical to each other with respect to the axis AX31. Monitor elements 376 and 378 are also symmetrical to each other with respect to the axis AX31.

Furthermore, monitor elements 337 and 375 are symmetrical to each other with respect to axis AY32 which is the center line of arm 321 in the direction of Y-axis. Monitor elements 338 and 376 are symmetrical to each other with respect to axis AY33 which is the center line of arm 322 in the direction of Y-axis. Monitor elements 339 and 377 are symmetrical to each other with respect to the axis AY32 which is the center line of arm 323 in the direction of Y-axis. Monitor elements 340 and 378 are symmetrical to each other with respect to the axis AY33 which is the center line of arm 324 in the direction of Y-axis.

In this case, a condition of drive vibration based on a value obtained in drive circuit 350 by subtracting the summed signals of monitor elements 375 to 378 from the summed signals of monitor elements 337 to 340, while also cancelling out undesired signals attributed to accelerations.

In angular velocity sensors 316, 316A, and 316B according to Embodiment 6, arms 321 to 324 connected to weights 325 to 328 are supported by lateral beam 320 which is supported by longitudinal beams 318 and 319 which are supported by support body 317. This structure can detect an angular velocity about any axis of the three axes simultaneously while having a disadvantage that the structure may accept an influenced, such as an acceleration or impacts. The canceling of the components attributable to angular velocities about the other axes and accelerations is effective particularly for this structure of angular velocity sensors 316, 316A, and 316B.

INDUSTRIAL APPLICABILITY

An angular velocity sensor according to the present invention can detect angular velocities accurately, and are useful for mobile devices, such as portable terminals and motor vehicles.

REFERENCE MARKS IN THE DRAWINGS

116 Angular Velocity Sensor
117 Support Body
118, 119 Longitudinal Beam
120 Lateral Beam
121-124 Arm
121F Inner Circumferential Edge (First Inner Circumferential Edge)
121G Outer Circumferential Edge (First Outer Circumferential Edge)
121H Center Line (First Center Line)
125-128 Weight
129-136 Drive Element
137-140 Monitor Element
141-148 Detector Element
167-174 Drive Element
175 Angular Velocity Sensor
176-179 Detector Element
180 Angular Velocity Sensor
181-184 Detector Element
191 Drive Unit
192 Monitor Unit
193 Detector Unit
216 Angular Velocity Sensor
217 Support Body
218, 219 Longitudinal Beam
220 Lateral Beam
221-224 Arm
225-228 Weight
229-236 Drive Element
237-240 Monitor Element
241-248 Detector Element
267-274 Drive Element
291 Drive Unit
292 Monitor Unit
293 Detector Unit
316 Angular Velocity Sensor
317 Support Body
318, 319 Longitudinal Beam
320 Lateral Beam
321-324 Arm
325-328 Weight
329-336 Drive Element
337-340 Monitor Element
341-348 Detector Element
367-374 Drive Element
375-378 Monitor Element
391 Drive Unit
392 Monitor Unit
393 Detector Unit
429-436 Detector Element
441-448 Drive Element
AX11 Axis (First Axis)
AX21 Axis (First Axis)
AX22 Axis (Third Axis)
AX23 Axis (Fourth Axis)
AX31 Axis (First Axis)
AY11 Axis (Second Axis)
AY12 Axis (Third Axis)
AY13 Axis (Fourth Axis)
AY21 Axis (Second Axis)
AY24 Axis (Third Axis)
AY25 Axis (Fourth Axis)
AY31 Axis (Second Axis)
AY32 Axis (Third Axis)
AY33 Axis (Fourth Axis)
B101 Middle Line

The invention claimed is:

1. An angular velocity sensor comprising:
a support body, wherein an X-axis, a Y-axis, and a Z-axis that are perpendicular to each other are defined;
a retaining portion connected to the support body;
first to fourth weights;
a first arm having one end supported by the retaining portion and another end connected to the first weight, the first arm extending in a positive direction of the Y-axis from the one end of the first arm;
a second arm having one end supported by the retaining portion and another end connected to the second weight, the second arm extending in the positive direction of the Y-axis from the one end of the second arm;
a third arm having one end supported by the retaining portion and another end connected to the third weight, the third arm extending in a negative direction of the Y-axis from the one end of the third arm;
a fourth arm having one end supported by the retaining portion and another end connected to the fourth weight, the fourth arm extending in the negative direction of the Y-axis from the one end of the fourth arm;
a drive unit for driving the first to fourth arms in parallel to an X-Y plane that contains the X-axis and the Y-axis;
a monitor unit for detecting displacements of the first to fourth arms in a direction parallel to the X-Y plane; and
a detector unit for detecting displacements of the first to fourth arms,
wherein the detector unit is symmetrical with respect to a first axis parallel to the X-axis, and is symmetrical with respect to a second axis parallel to the Y-axis,
wherein the detector unit includes:
first and second detector elements disposed on the first arm;
third and fourth detector elements disposed on the second arm;
fifth and sixth detector elements disposed on the third arm; and
seventh and eighth detector elements disposed on the fourth arm,
wherein the first and third detector elements are symmetrical to each other with respect to the second axis,
wherein the second and fourth detector elements are symmetrical to each other with respect to the second axis,
wherein the fifth and seventh detector elements are symmetrical to each other with respect to the second axis,
wherein the sixth and eighth detector elements are symmetrical to each other with respect to the second axis,
wherein the first and fifth detector elements are symmetrical to each other with respect to the first axis, wherein the second and sixth detector elements are symmetrical to each other with respect to the first axis,
wherein the third and seventh detector elements are symmetrical to each other with respect to the first axis, and
wherein the fourth and eighth detector elements are symmetrical to each other with respect to the first axis.

2. The angular velocity sensor according to claim 1,
wherein the first and second detector elements are symmetrical to each other with respect to a third axis parallel to the Y-axis,
wherein the third and fourth detector elements are symmetrical to each other with respect to a fourth axis that is symmetrical to the third axis with respect to the second axis,
wherein the fifth and sixth detector elements are symmetrical to each other with respect to the third axis, and
wherein the seventh and eighth detector elements are symmetrical to each other with respect to the fourth axis.

3. The angular velocity sensor according to claim 1,
wherein the first arm is curved to have a first inner circumferential edge extending along an inner circumferential side of the first arm and a first outer circumferential edge extending along an outer circumferential side of the first arm,
wherein the first detector element and the second detector element extend along the first arm, and
wherein a middle line extending along a middle between the first and second detector elements is located between the first inner circumferential edge and a first center line extending along a middle between the first inner circumferential edge and the first outer circumferential edge.

4. The angular velocity sensor according to claim 3,
wherein the first arm is curved, and
wherein the first and second detector elements are curved along the first arm.

5. The angular velocity sensor according to claim 3,
wherein the second arm is curved to have a second inner circumferential edge extending along an inner circumferential side of the second arm and a second outer circumferential edge extending along an outer circumferential side of the second arm,
wherein the third and fourth detector elements extend along the second arm,
wherein a middle line extending along a middle between the third and fourth detector elements is located between the second inner circumferential edge and a second center line extending along a middle between the second inner circumferential edge and the second outer circumferential edge;
wherein the third arm is curved to have a third inner circumferential edge extending along an inner circumferential side of the third arm and a third outer circumferential edge extending along an outer circumferential side of the third arm,
wherein the fifth and sixth detector elements extend along the third arm;
wherein a middle line extending along a middle between the fifth and sixth detector elements is located between the third inner circumferential edge and a third center line extending along a middle between the third inner circumferential edge and the third outer circumferential edge;
wherein the fourth arm is curved to have a fourth inner circumferential edge extending along an inner circumferential side of the fourth arm and a fourth outer circumferential edge extending along an outer circumferential side of the fourth arm,
wherein the seventh and eighth detector elements extend along the fourth arm; and
wherein a middle line extending along a middle between the seventh and eighth detector elements is located between the fourth inner circumferential edge and a fourth center line extending along a middle between the fourth inner circumferential edge and the fourth outer circumferential edge.

6. An angular velocity sensor comprising:
a support body, wherein an X-axis, a Y-axis, and a Z-axis that are perpendicular to each other are defined;
a retaining portion connected to the support body;
first to fourth weights;
a first arm having one end supported by the retaining portion and another end connected to the first weight, the first arm extending in a positive direction of the Y-axis from the one end of the first arm;
a second arm having one end supported by the retaining portion and another end connected to the second weight, the second arm extending in the positive direction of the Y-axis from the one end of the second arm;
a third arm having one end supported by the retaining portion and another end connected to the third weight, the third arm extending in a negative direction of the Y-axis from the one end of the third arm;
a fourth arm having one end supported by the retaining portion and another end connected to the fourth weight, the fourth arm extending in the negative direction of the Y-axis from the one end of the fourth arm;
a drive unit for driving the first to fourth arms in parallel to an X-Y plane that contains the X-axis and the Y-axis;
a monitor unit for detecting displacements of the first to fourth arms in a direction parallel to the X-Y plane;
a detector unit for detecting displacements of the first to fourth arms;
a first longitudinal beam supported by the support body, the first longitudinal beam extending in parallel to the Y-axis;
a second longitudinal beam supported by the support body, the second longitudinal beam extending in parallel to the Y-axis; and
a lateral beam supported between the first longitudinal beam and the second longitudinal beam,
wherein the detector unit is symmetrical with respect to a first axis parallel to the X-axis, and is symmetrical with respect to a second axis parallel to the Y-axis,
wherein the retaining portion is provided in the lateral beam,
wherein the detector unit includes:
first and second detector elements disposed on the first longitudinal beam; and
third and fourth detector elements disposed on the second longitudinal beam,
wherein the first and third detector elements are symmetrical to each other with respect to the second axis,
wherein the second and fourth detector elements are symmetrical to each other with respect to the second axis,
wherein the first and second detector elements are symmetrical to each other with respect to the first axis,
wherein the third and fourth detector elements are symmetrical to each other with respect to the first axis, and
wherein the angular velocity sensor detects an angular velocity about the X-axis based on signals output from the first to fourth detector elements.

7. An angular velocity sensor comprising:
a support body, wherein an X-axis, a Y-axis, and a Z-axis that are perpendicular to each other are defined;

a retaining portion connected to the support body;
first to fourth weights;
a first arm having one end supported by the retaining portion and another end connected to the first weight, the first arm extending in a positive direction of the Y-axis from the one end of the first arm;
a second arm having one end supported by the retaining portion and another end connected to the second weight, the second arm extending in the positive direction of the Y-axis from the one end of the second arm;
a third arm having one end supported by the retaining portion and another end connected to the third weight, the third arm extending in a negative direction of the Y-axis from the one end of the third arm;
a fourth arm having one end supported by the retaining portion and another end connected to the fourth weight, the fourth arm extending in the negative direction of the Y-axis from the one end of the fourth arm;
a drive unit for driving the first to fourth arms in parallel to an X-Y plane that contains the X-axis and the Y-axis;
a monitor unit for detecting displacements of the first to fourth arms in a direction parallel to the X-Y plane;
a detector unit for detecting displacements of the first to fourth arms;
a first longitudinal beam supported by the support body, the first longitudinal beam extending in parallel to the Y-axis;
a second longitudinal beam supported by the support body, the second longitudinal beam extending in parallel to the Y-axis; and
a lateral beam supported between the first longitudinal beam and the second longitudinal beam,
wherein the detector unit is symmetrical with respect to a first axis parallel to the X-axis, and is symmetrical with respect to a second axis parallel to the Y-axis,
wherein the retaining portion is provided in the lateral beam,
wherein the detector unit includes first to fourth detector elements disposed on the lateral beam,
wherein the first and second detector elements are symmetrical to each other with respect to the second axis,
wherein the third and fourth detector elements are symmetrical to each other with respect to the second axis,
wherein the first and third detector elements are symmetrical to each other with respect to the first axis,
wherein the second and fourth detector elements are symmetrical to each other with respect to the first axis, and
wherein the angular velocity sensor detects an angular velocity about the Y-axis based on signals output from the first to fourth detector elements.

* * * * *